US005883326A

United States Patent [19]

Goodman et al.

[11] Patent Number: 5,883,326

[45] Date of Patent: Mar. 16, 1999

[54] MUSIC COMPOSITION

[75] Inventors: Rodney M. Goodman, Altadena; Randall R. Spangler, Pasadena, both of Calif.

[73] Assignee: California Institute of Technology, Pasadena, Calif.

[21] Appl. No.: 56,148

[22] Filed: Apr. 6, 1998

Related U.S. Application Data

[63] Continuation-in-part of Ser. No. 618,906, Mar. 20, 1996, Pat. No. 5,736,666.

[51] Int. Cl.[6] .............................. G01H 1/00; G01H 1/12; G01H 1/38

[52] U.S. Cl. ................................ 84/649; 84/634; 84/637; 84/666; 84/669

[58] Field of Search ..................... 84/634–637, 649–651, 84/666, 667, 669, DIG. 9, 609, 610, 613

[56] References Cited

U.S. PATENT DOCUMENTS 5,736,666 4/1998 Goodman et al. ........................ 84/669

*Primary Examiner*—William M. Shoop, Jr.
*Assistant Examiner*—Marlon T. Fletcher
*Attorney, Agent, or Firm*—Fish & Richardson P.C.

[57] ABSTRACT

A music composition system, comprising receiving a first harmony including a first melody, analyzing the first harmony to derive in real-time a rule relating the first melody to the first harmony, receiving a second melody, and applying the rule in real-time to the second melody to produce a second harmony relating to the second melody.

1 Claim, 14 Drawing Sheets

$$J(X;Y=y)+p(y)\bullet[\,P(X|Y)\bullet\log\,(\frac{p(x|y)}{p(x)})+(1-p(x|y)\bullet\log\,(\frac{(1-p(x|y)\,)}{(1-p(x)\,)})\,]$$

*FIG. 4*

MUSIC COMPOSITION

This is a continuation-in-part of U.S. application Ser. No. 08/618,906, filed Mar. 20, 1996, now U.S. Pat. No. 5,736, 666.

BACKGROUND OF THE INVENTION

1. Field of the Invention

The invention relates to computer-aided music analysis and composition.

2. Description of the Prior Art

Composition and playing of music requires years of dedication to the cause. Many talented individuals are simply unable to dedicate so much of their lives to learning the skill. Technology has grappled with allowing non-practiced individuals to play music for years. Player pianos, automated music and rhythm organs, and electronics keyboards have minimized the learning curve. While these devices automated some parts of music reproduction to some extent, they severely constrained creativity.

The player piano, for example, used a predetermined program indicated by holes in a roll of paper. The keys that were pressed based on those holes were indifferent to the creative ideas of an unskilled operator.

All of these technologies force operators to rely on pre-packaged music originated by others. They allow very little creativity. Even the keynote in which the pre-programmed sounds are to be played is preselected. Merely arranging snippets of another's music has proved a poor substitute for creating one's own music.

Recently, some have tried to apply computer power in aid of the composer. U.S. Pat. No. 5,308,915 is representative of the many systems that use a neural network. Computer-based music analysis and composition has used, for example, neural network computer technology. Neural networks which make use of concepts related to the operation of the human brain. Neural networks operate in an analog or continuously variable fashion. Some neural network approaches use some sort of rule-based preprocessing and post-processing. The knowledge which the system uses to make its decisions is inaccessible to the user.

For example, takes a system with the following steps:

Input from MIDI keyboard (10)
|
|
Preprocessor puts input into a form that a neural network can understand (20)
|
|
Neural network (30)
Postprocessor to turn neural network output back into MIDI (40)
|
Output to MIDI sound module (50)

The input and output that the system is sending may be understandable at each point in the process. However, ALL of the LEARNED knowledge that the system uses to make its decisions is hidden in the weights of the connections inside the neural network (30). The inventors recognized that this knowledge is extremely difficult to extract from the network. It is difficult to phrase music in a form directly that can be understood by a network. All neural networks share the common characteristic that at some point in the process, knowledge is not stored in a directly-accessible declarative form.

Another limitation commonly encountered in neural network approaches is related to external feedback, where the output of the network is used at some point in the future as input to the network. Here, the analog nature of the network allows it to slide away from the starting point and toward s one of the melodies on which it was trained. One example is a network which learned the "blue danube". The problem with this network was that no matter what input you gave it, eventually it started playing the blue danube. The key point here is that the network may have learned the blue danube, but it did NOT learn HOW to write it or how to write SIMILAR but not IDENTICAL music.

Moreover, neural networks are analog machines, and it is difficult to make an analog machine (a neural network) approximate a discrete set of data (music with a finite number of pitches and rhythmic positions).

One type of network used for composition is a single feed-forward network. This network has been used to associate chords with melodies. This system was described by Shibata in 1991. This system represents chords as their component tones instead of by their figured bass symbols. The network also required the entire melody at once, meaning it could not be performed in real-time as the melody was being generated by a musician. An important contribution from Shibata's work is the use of psychophysical experiments to gauge the success of a computer compositional approach; listeners evaluated the output of the network compared to a table-driven harmonizing approach and indicated a measure of how natural the output sounded.

Adding recurrent connections to a neural network provides additional computational complexity, and allows the network to evolve some sense of movement through time. This approach has been used to teach a network a single 153-note melody.

The inventors recognized certain limitations in these previous studies. Neural networks have a continuous analog nature, which has proven to be difficult to apply to apply to music's a discrete set of events. Almost all music has some sort of regular rhythm, with notes starting either directly on a beat or at just a simple fraction of the beat. Note durations behave similarly.

Most music is also tonal, using only a finite number of pitch values. Neural networks, which use a continuous or analog mode of operation, require excessive training to approximate this discrete behavior. This is a very inefficient use of a nueral network.

Neural networks learn in a connective way, which is not conducive to determination of the rationale behind the learning. The inventors recognized that a music composer either likes or dislikes certain effects which have been obtained. It is an object of the present invention to allow the composer to interact with the computer based learning system by viewing and/or modifying the results of the computer based learning system. It might be possible to modify a neural network to respond to feedback from a user about what that user likes or dislikes as suggested according to the present invention. Even if this were done, however, it would not be easy to ask the network, "I HATE that! Why did you do that?"

Some research has been done using rule-based computer analyses that learn from examples. Rule-based systems are inherently discrete, easing system training. An example of a generic rule is shown below, with a left-hand side (LHS) referencing one or more attributes $A_x$ and a right-hand side (RHS) referencing an attribute $A_{RHS}$. Such a rule inferences the RHS attribute $A_{RHS}$. A set of such rules is known as a rule base.

$$\overbrace{\text{IF } A_1 = a_{1,2} \text{ and } A_2 = a_{2,5}}^{LHS} \text{ THEN } \overbrace{A_{RHS} = a_{RHS,3}}^{RHS}$$

U.S. Pat. No. 5,418,325 describes a computer receiving a musical element, i.e., a series of notes over time. This is used to build a table of rules that indicate which notes are most likely to follow each note received. Such a table is of some help to a composer of a new element in order to create a series of notes that are pleasing to the ear.

The inventors recognized that this will give a correct distribution, but will not necessarily sound good. Music which is done purely probabalistically is BORING, i.e., it doesn't interest the ear.

U.S. Pat. No. 5,418,323 describes a system in which rules built from a small seed string of notes. The system is usually not responsive to feedback in real-time.

The systems of U.S. Pat. Nos. 5,302,777, 5,218,153, and 4,981,544, for example, create such competing rules but follow through with only simplistic methods of making use of these rules. The present invention defines a new technique of weighing which allows competing rules to be maintained and appropriately used.

It is hence an object of the present invention to provide a system which includes all of the advantageous aspects of the present invention—a system which operates using the least possible amount of computer power to learn musical rules and weights and apply them in real-time. The present invention also allows interaction with the rules, e.g. by viewing and/or modifying the rules that have fired.

The system preferably stores information in the form of rules, unlike the conventional learning system which stores information. The use of rules in addition to learning provides some of the benefits of both. The present invention uses probabilistic rules to obtain many of the capabilities of analog networks. By so doing, the present invention obtains all of the benefits of a rule-based system. This allows us to ask the system to explain its decisions.

Practical operation of these systems is enhanced if the rule base is appropriately managed. Another aspect of the present invention defines a special real-time dependency pruning system which enhances the accuracy of the rulebase. Another aspect teaches segmenting the rulebases in a way which facilitates their use. Yet another aspect of the invention defines using probabilistic, e.g., not deterministic, rules.

The operating techniques used by the present invention allow a simple algorithm with small chunks of data to accompany a live musician. The preferred system uses special rules which are optimized for the use according to the present invention.

It is therefore an object of the invention to provide a music composition system useful to one lacking formal training in musical arts. Another object is to provide a system which creates rules through analysis of music. Another object of the system is to provide a real-time composition system which applies these rules in real-time. The present system does not need to create the rules in real-time. In fact, the computers presently being used take several minutes to create the rules it later is able to apply to musical input with a delay of less than 1/10 second.

Another object of the invention is to provide an automated music composition system that creates rules through real-time analysis of music. In addition, it is an object of the invention to provide an automated music composition system requiring little explicitly-coded knowledge of music. It is a further object of the invention to provide an automated rule-based music composition system in which multiple competing rules contribute to an outcome. Still another object of the invention is to provide an automated rule-based music composition system using special rules optimized to provide the best results.

BRIEF DESCRIPTION OF THE DRAWINGS

These and other aspects of the invention will now be described in detail with reference to the accompanying drawings, wherein:

FIG. 4 shows a formula which determines a J-measure according to the invention;

DESCRIPTION OF THE PREFERRED EMBODIMENTS

It should be understood that many of the techniques described herein are intended to be carried out in software on a computer-based system, such as a personal computer or synthesizer. The following describes the functions that are carried out.

The music composition system of the present invention automatically learns rules representing a particular style of music and uses those rules to generate new music in the same style. The generated accompaniment can be for a performing musician in real-time.

Figure 1:
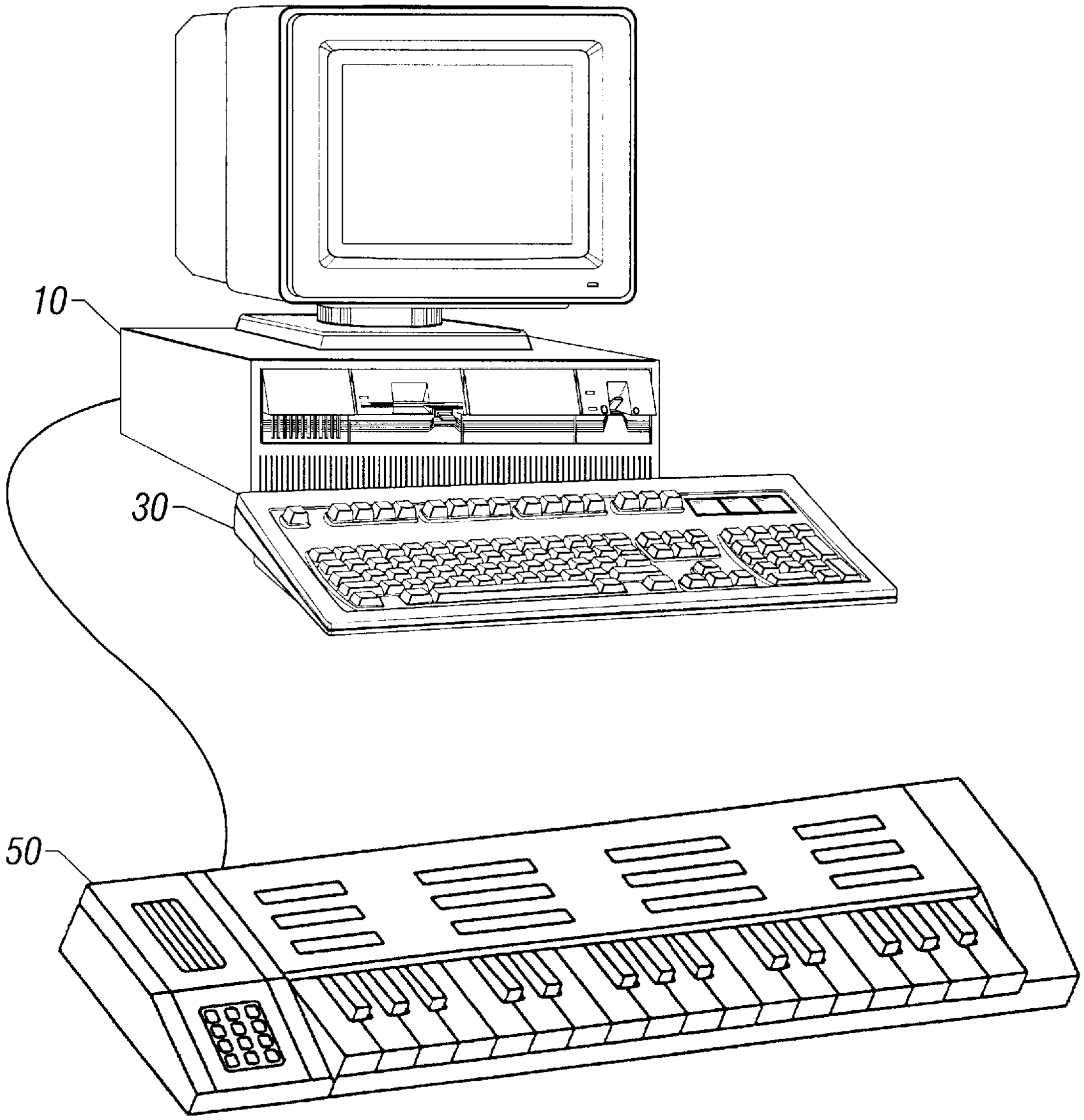
FIG. 1 is a diagram of hardware equipment connections according to the invention.

FIG. 1 shows the system using a standard 486SX computer 10 running a standard operating system, e.g., DOS or a multithreaded operating system such as Microsoft Windows NT. User input in, e.g., MIDI format can be accepted through the computer keyboard 30 or through any synthesizer or musical keyboard connected to the computer by a standard MIDI interface. The system's output is sent via the MIDI interface to a synthesizer 50 for playback.

The application examples below provide a context for the detailed information to follow. For instance, the system can operate as a computerized expert trained using examples of a particular musical style. Students attempting to write music in the particular style can ask the computerized expert not only to check their compositions for errors but also to suggest alternatives. Because the system is rule-based, the computerized expert based on the system can also provide explanations showing why the suggestions overcome the errors.

The system can also allow comparison of two or more different composers' works by generating a rule base for each composer. Furthermore, a musical piece can be checked against a particular composer's known rule base to determine whether the piece was in fact authored by that composer.

Soundtracks can be generated using the system. The system creates rule bases, i.e. is trained, from musical pieces known to provoke certain feelings or having certain styles. These rule bases can be used subsequently to generate music appropriate for particular situations.

The system can make a small number of musicians sound like a large orchestra. For example, additional musical lines generated from an existing four- or five-part harmony can be fed to the synthesizer to make a string quartet sound like an entire string orchestra.

Along the same lines, the system can simulate a rock-n-roll band, allowing an aspiring musician to play along. With the aspiring musician's musical instrument plugged into the computer and the style of each member of, say, The Beatles musical group encoded into an individual rule base, the system can accompany the aspiring musician in much the same way as The Beatles would have. Furthermore, trained on a missing member's style, the system can take the place of that member in a musical group's subsequent recordings.

The system is capable of learning all of its musical knowledge from sample pieces of music. This capability provides flexibility, allowing application of the system to musical styles not originally planned. In addition, because the rules are determined and applied automatically, requiring no hand-tuning, the system works well for users lacking much technical knowledge of music. Finally, able to accept industry-standard MIDI song files as musical input, the system can generate, quickly and easily, series of rule bases representing the styles of various composers. Control over rule generation is available for advanced users of the system.

A particularly useful feature of the system is its ability to demonstrate the basis of its decisions by listing the rules extracted during training. Such listings make the system useful as an interactive aid for teaching music theory and as a tool for historians attempting to understand the creative processes of composers such as Bach and Mozart.

A further indication of the system's power is its ability to resolve conflicts when two or more rules call for different outcomes. The system employs several such schemes, including rule weighing and real-time dependency pruning.

The present invention provides efficient ways of generating and activating, or firing, rules, allowing the system to operate in real-time using everyday computers. Thus any live musician can use the system to generate accompaniment. The real-time aspect of the system also fits well with other interactive tasks, such as teaching music theory.

An example of the system's work is shown below. Using the well-known Bach chorales as input, the system generates the five rules below, which are some of the most commonly-used rules in classical Bach harmony, typically appearing in any first-year music theory textbook.

| | | | |
|---|---|---|---|
| 1. | IF | Melody0 E | THEN Function0 1 |
| | AND | Function1 V | |
| | (G Major to C Major) | | |
| 2. | IF | Melody0 F | THEN Function0 IV |
| | AND | Function1 V | |
| | (G Major to F Major) | | |
| 3. | IF | Function1 V | THEN Inversion0 I1 |
| | AND | Function0 IV | |
| 4. | IF | Function1 V | THEN Inversion0 I0 |
| | AND | Function0 I | |
| 5. | IF | Function0 vii07 | THEN Inversion0 I1 |

The system does not use a textbook but learns such rules on its own, as explained below.

Figure 2:
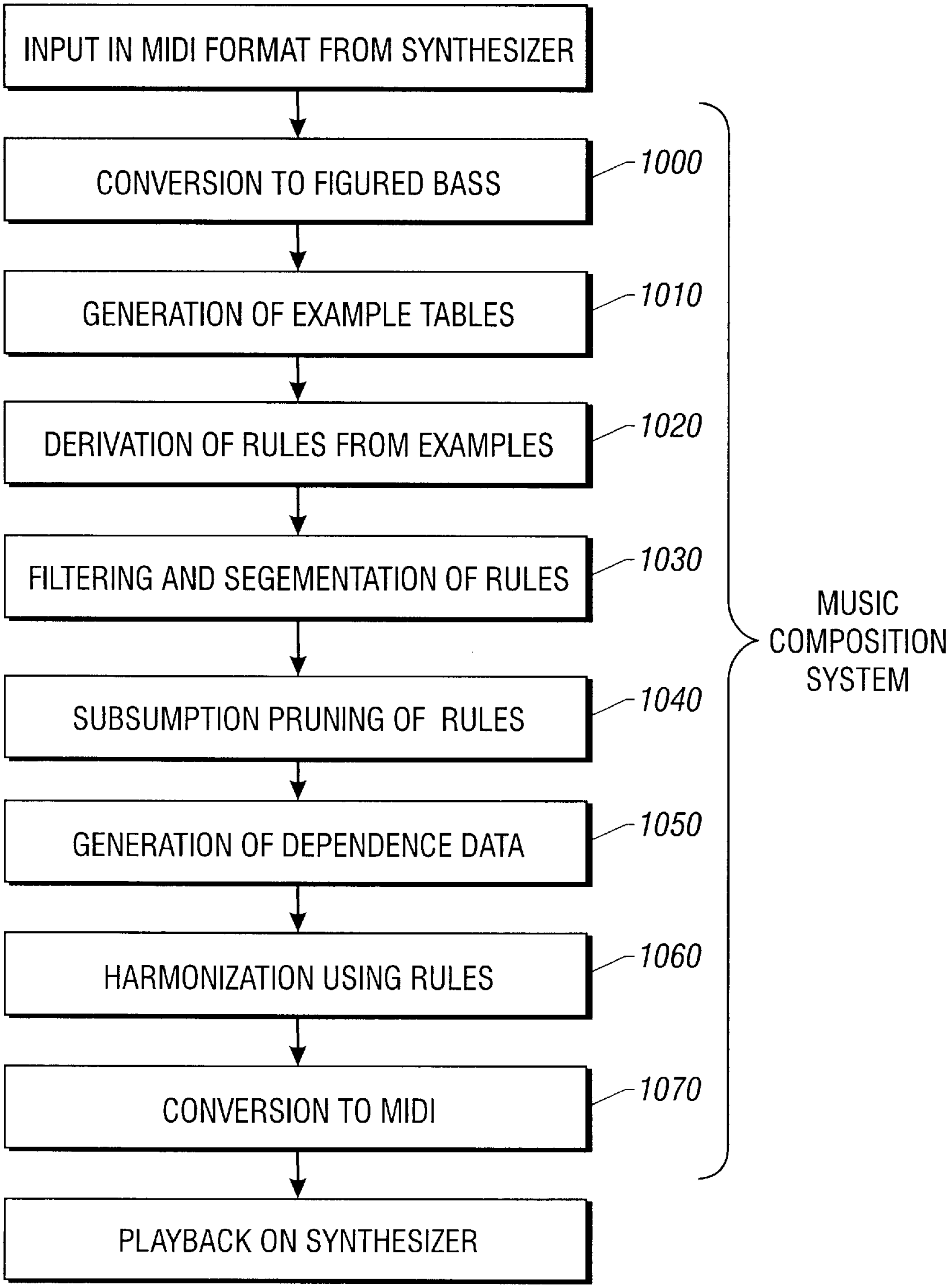
FIG. 2 is an overall flowchart of a method of music composition according to the invention.

FIG. 2 is a flowchart showing the operation of the system. The flowchart shows the overall operation, including:

Conversion to figured bass (step 1000),

Generation of example tables (step 1010),

Derivation of rules from examples (step 1020),

Filtering and segmentation of rules (step 1030),

Subsumption pruning of rules (step 1040),

Generation of dependence data (step 1050),

Harmonization using rules (step 1060), and

Conversion to MIDI (step 1070).

The preferred system works with musical information represented in a variation of a form known as figured bass. The figured bass form has been used frequently by composers to present a piece's harmonic information without stating the precise location, duration, and pitch for every single note. In classical form, a figured bass states the melody and represents the underlying harmony as a series of chords. Each chord is specified by its function in the key of the piece of music, written as a Roman numeral or "figure," and the pitch which is being played by the bass voice. There are usually several ways of voicing any given figure, i.e., turning the figured bass representation back into notes. The preferred system uses an extended form of figured bass that includes the chord notes played by all the voices, which allows the system to turn the figured bass back into notes while playing.

Conversion to figured bass

The conversion step 1000 converts music represented in MIDI file format into the figured bass format needed by the steps that follow. The MIDI file format is a specification for storage and transmission of musical data. Under MIDI, musical data is arranged as a stream of events occurring at specified intervals. The following is a typical stream of MIDI data:

```
Header format=0 ntrks=1 division=240
Track start
Delta time=0 Time signature=3/4 MIDI-clocks/click=24 32nd
   notes/24 -MIDI-clocks=8
Delta time=0 Tempo, microseconds-per-MIDI-quarter-note=41248
Delta time=0 Meta Text, type=0x01 (Text Event) leng=23
      Text = <Chorale #001 in G Major>
Delta time=480 Note on, chan=1 pitch=67 vol=88
Delta time=0 Note on, chan=2 pitch=62 vol=72
Delta time=0 Note on, chan=3 pitch=59 vol=88
Delta time=240 Note off, chan=4 pitch=43 vol=64
Delta time=0 Note off, chan=3 pitch=59 vol=64
Delta time=0 Note off, chan=2 pitch=62 vol=64
Delta time=0 Note off, chan=1 pitch=67 vol=64
Delta time=0 Note on, chan=1 pitch=67 vol=81
Delta time=0 Note on, chan=2 pitch=62 vol=75
Delta time=0 Note on, chan=3 pitch=59 vol=88
Delta time=0 Note on, chan=4 pitch=55 vol=60
Delta time=240 Note off, chan=4 pitch=55 vol=64
Delta time=0 Note off, chan=3 pitch=59 vol=64
Delta time=0 Note off, chan=2 pitch=62 vol=64
Delta time=0 Note on, chan=2 pitch=64 vol=58
Delta time=0 Note on, chan=3 pitch=60 vol=78
Delta time=1920 Meta Text, type=0x01 (Text Event) leng=7
      Text = <Fermata>
```

Each line in the stream is an event. For example, in the line "Delta time=240 Note off, chan=4 pitch=43 vol=64," the phrase "Delta time=240" means that the line starts executing 240 MIDI-clocks of time after the last line started executing. "Note off" indicates that the note presently being played by channel, i.e., voice "4" is to be turned off.

The significant events in the sample data are listed in the following table.

| Event | Function | Relevant Parameters | Meaning |
|---|---|---|---|
| Time signature | Gives information about the timing of the piece | Time signature | Needed to convert beats into measures and to determine beat accents. |
| | | 32nd-notes/24-MIDI-clocks | Needed to convert current time into beat number. |
| Note on/Note off | Turns a note on or off for a specific voice | Channel | Which voice is changing (1 = soprano, 2 = alto, 3 = tenor, 4 = bass) |
| | | Pitch | Which note is changing (pitch = 60 is middle $C^3$). |
| Meta Text | Allows arbitrary messages to be sent | Text | "Chorale #0001 in G Major" gives the name and key of the piece. "Fermata" states that there is a fermata on the chord starting at that time. |

The inventors prefer using musical data that is not in the MIDI format as their input for musical analysis. In MIDI data, which notes are being played at a given point in time is difficult to determine because the durations of the notes are not explicitly coded. Rhythmic structure is difficult to determine as well. The MIDI format is sensitive to the exact notes being played. For example, transposing the piece, i.e., adding a fixed pitch interval to all notes, changes every pitch in the music's MIDI data stream. If a piece is transposed up a semitone (from C to C-sharp, for example), every single pitch in the MIDI data changes. Even minor changes in the voicing of a chord have radically different representations in the MIDI data. For example, a C Major chord (C, E, G, C) could have pitches {60, 64, 79, 84}, or {67, 72, 76, 84}. The two voicings sound almost identical and have similar functions, but share only one common pitch. This problem is solved by transforming the data into a figured bass format.

The figured bass format used by the system more concisely states the harmonic content and rhythmic information for an accompaniment. In figured bass format as opposed to MIDI format, music is organized in terms of chords and beats instead of individual transition events. A typical figured bass corresponding to the first few chords of MIDI data listed above, follows.

| MEL | FUNC | IN | TP | AP | SP | DUR | ACC |
|---|---|---|---|---|---|---|---|
| C | I | I0 | T1 | A2 | S0 | 2 | un |
| C | I | I0 | T0 | A1 | S0 | 2 | acc |
| C | IV | I1 | T0 | A1 | S2 | 1 | un |
| C | vi | I0 | T2 | A0 | s1 | 1 | n |
| G | V | I1 | T2 | A0 | S0 | 2 | un |
| E | I | I0 | T0 | A2 | S1 | 2 | ACC |
| E | iii | I1 | T2 | A1 | S0 | 1 | un |
| D | V | I0 | T1 | A0 | S2 | 1 | n |
| C | vi | I0 | T1 | A2 | S1 | 2 | un |
| C | IV | I0 | T0 | A1 | S2 | 1 | ACC |
| C | — | — | — | — | — | 1 | n |
| C | — | I3 | T0 | A1 | S2 | 1 | un |
| D | vii07 | I1 | T2 | A0 | S1 | 1 | n |
| E | I | I0 | T2 | A0 | S1 | 2 | un |
| D | V | I0 | T0 | A1 | S2 | 4 | FERM |

The first column, with the heading MEL, lists the pitch played by the soprano, which is the melody note of the piece. Next is the column headed FUNC, which is the chord function or figure. The most common functions in a major key in the work of Bach, for example, are listed in the following function table, which is only a subset of the total list of functions used by the system.

| Function | Chord Name | Pitches |
|---|---|---|
| I | C Major | C, E, G |
| 17 | C7 | C, E, G, B-flat |
| ii | D minor | D, F, A |
| V/V | D Major | D, F-sharp, A |
| iii | E minor | E, G, B |
| V/vi | E Major | E, G-sharp, B |
| IV | F Major | F, A, C |
| V | G Major | G, B, D |
| V7 | G7 | G, B, D, F-sharp |
| vi | A minor | A, C, E |
| vii07 | B diminished 7th | B, D, F, A-flat |

The middle set of four columns, headed IN, TP, AP, and SP, indicate the positions, respectively, of the bass voice, or inversion; the tenor voice; the alto voice; and the soprano voice. The positions are numbered from 0 to 3, wherein 0 indicates the first pitch listed in the function table above and 3 indicates the fourth pitch. For example, again using the function table above, in the key of C major, a V7 chord with positions I0 T1 A3 S0 would contain, in order, the pitches G, B, F-sharp, and G. Use of this position notation provides the system with musical data that, while allowing easy reconstruction of the original pitches, is key-independent, because if a piece of music is transposed, its voice positions remain unchanged.

In addition, since figured bass reduces the number of possibilities from twelve pitches to four positions, the overall complexity of the set of musical data is reduced.

The next column, under the heading DUR, shows the duration of the particular chord. Lastly, the column headed ACC also indicates a timebase, by displaying the accent to be placed upon the chord. Under the ACC column, the following notations have the following meanings: "FERM", standing for fermata or held chord, indicates the strongest accent; "ACC" signals that the chord begins at the start of an accented beat; "un" specifies that the chord begins on an unaccented beat; and "n" means that the chord does not begin at the start of a beat.

Figure 3:
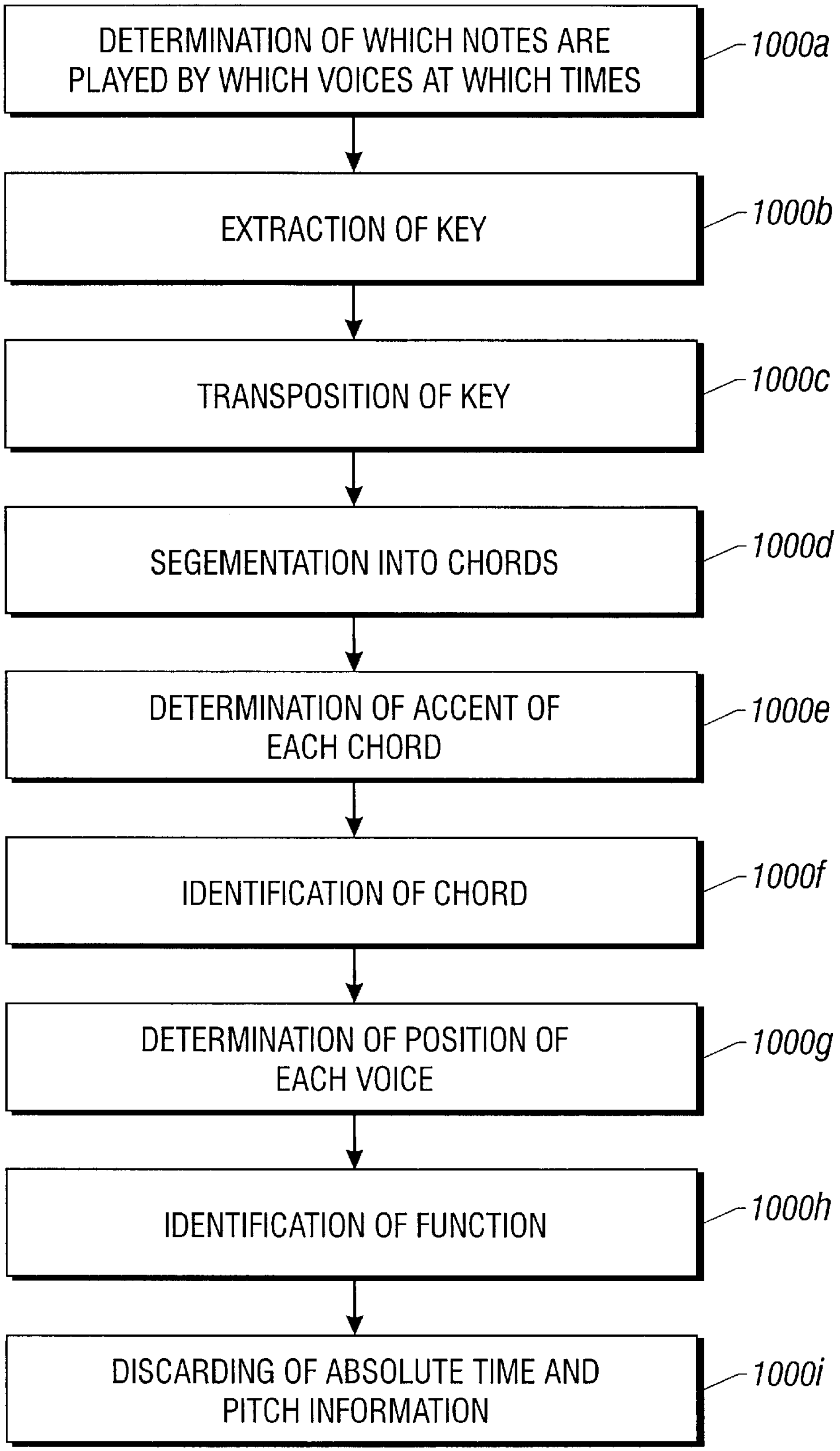
FIG. 3 is a flowchart of a method of conversion to figured bass according to the invention.
Figure 5:
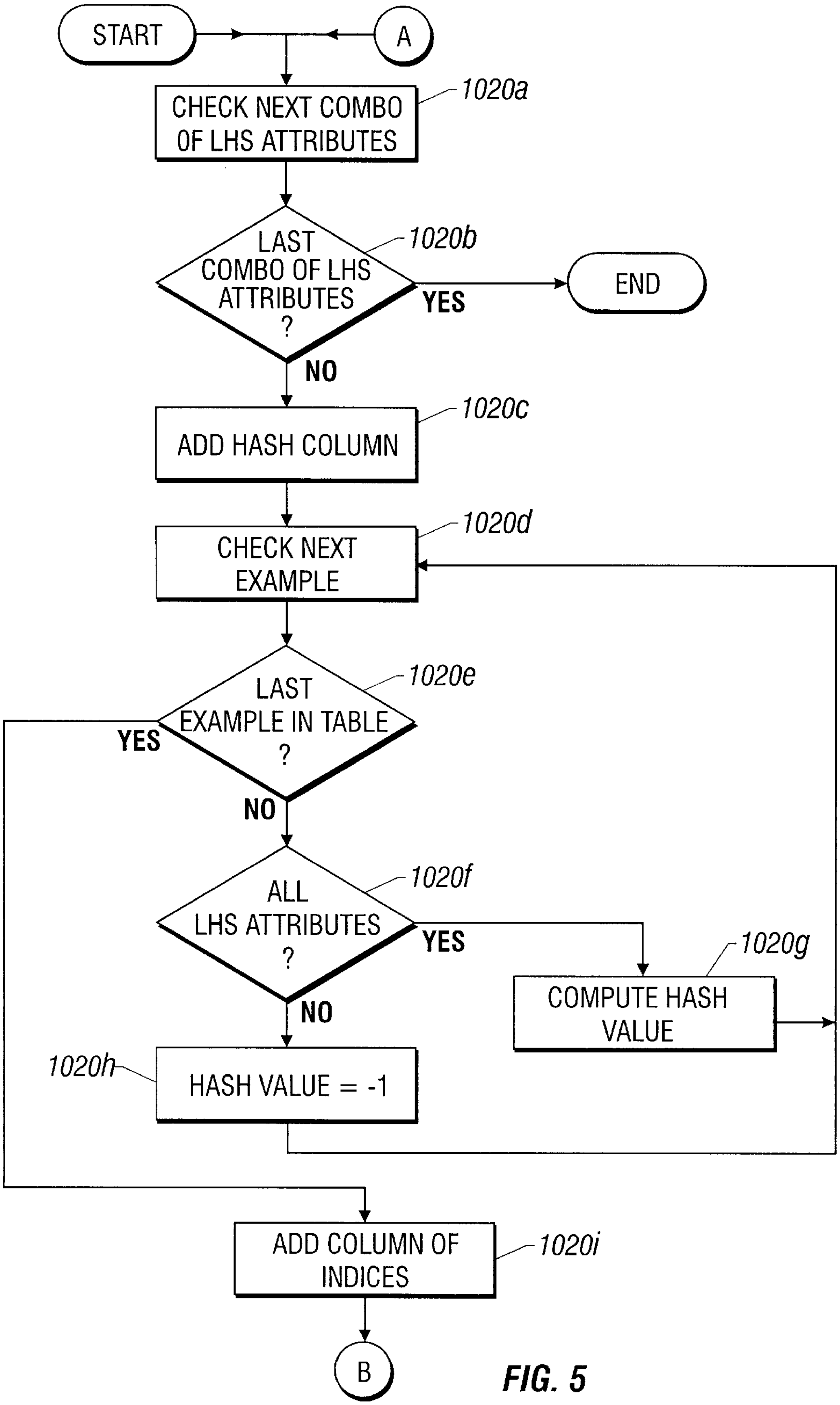
FIGS. 5–8 depict a detailed flowchart of a method of rule generation according to the invention.
Figure 6:
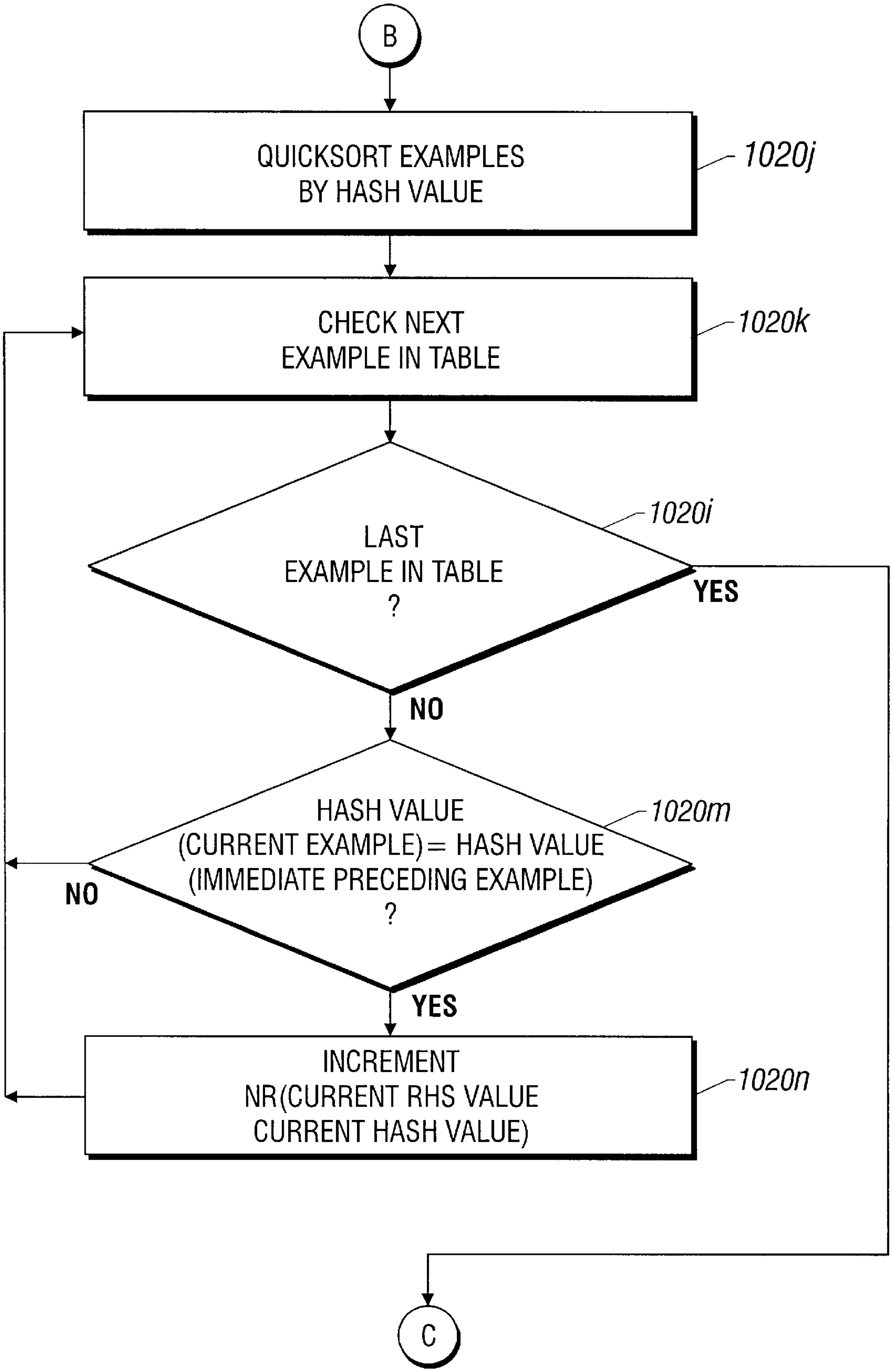
Figure 7:
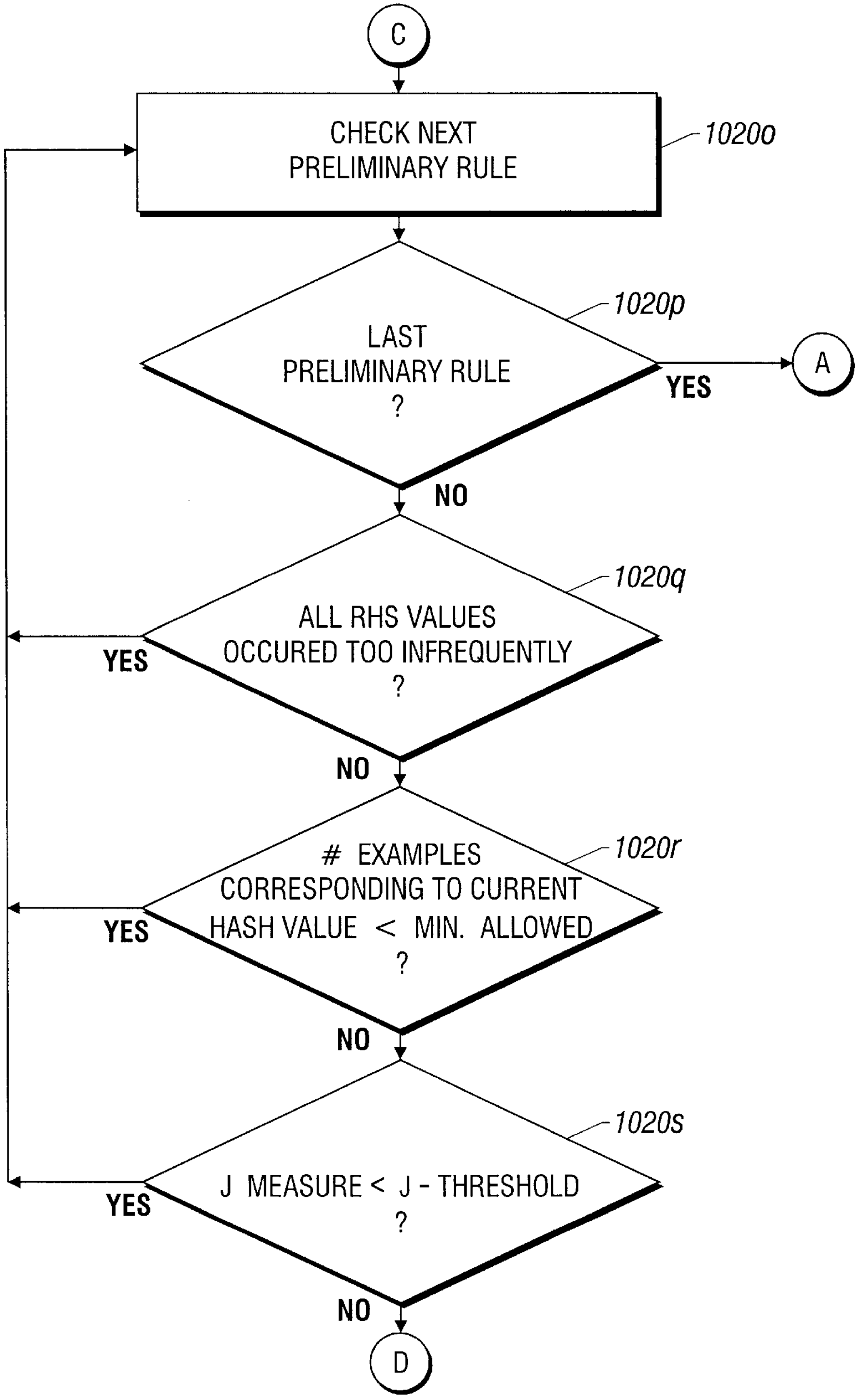
Figure 8:
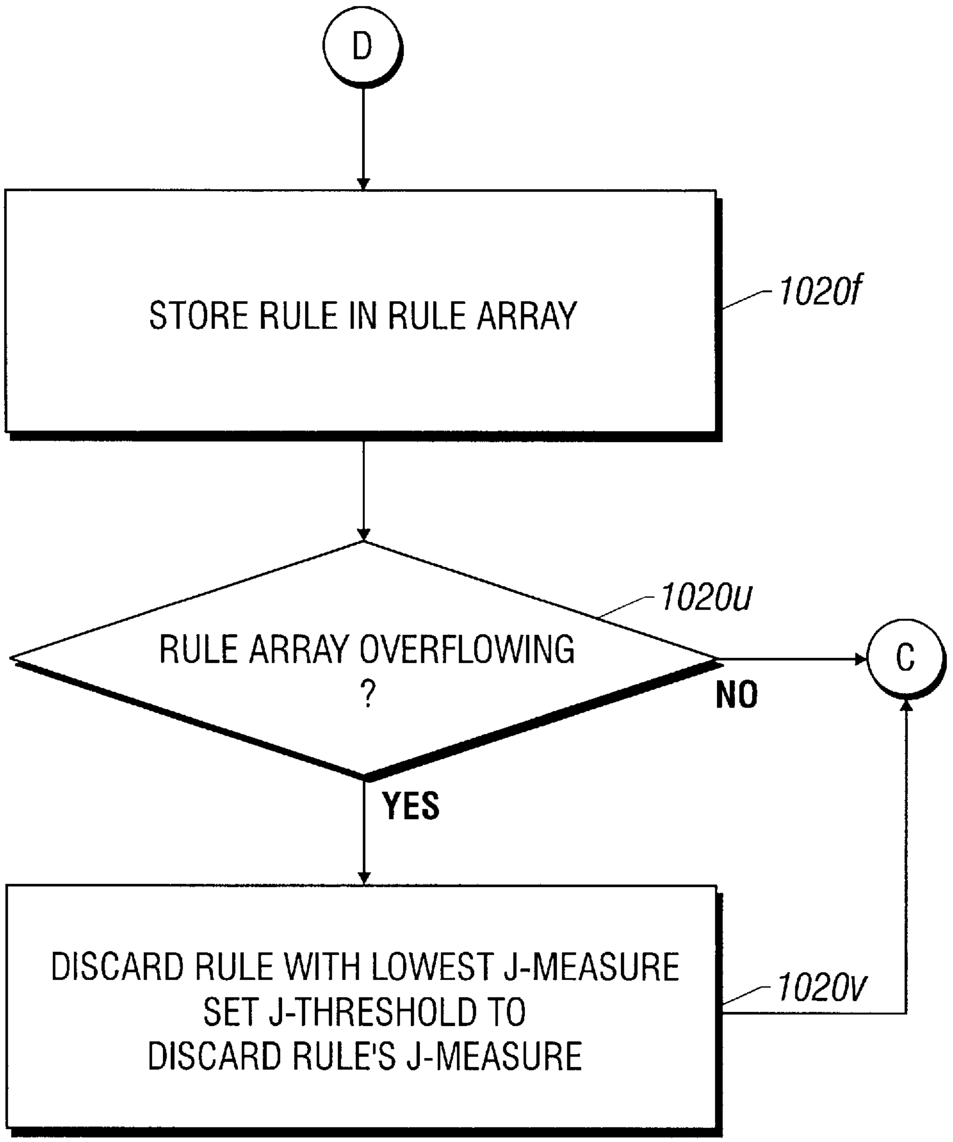

FIG. 3 shows converting a musical piece described in a MIDI file to the desired figured bass form. The system scans through the MIDI file and assembles all of the pieces together to determine which notes are being played by the voices, viz, bass, tenor, alto, soprano, and at which times (step 1000*a*). The system then extracts the key of the piece from the initial MIDI text event, an example of which is shown in the sample MIDI stream above (step 1000*b*). Standardizing to simplify later analysis and to ease comparisons of different pieces, the system transposes the piece to the key of C Major, with all of the pitches changing appropriately (step 1000*c*). Next, beginning a new chord whenever a voice changes pitch, the system segments the piece into chords (step 1000*d*).

Segmented into chords, the piece appears as follows.

| TIME | DUR | | B | T | A | S | |
|---|---|---|---|---|---|---|---|
| 000 | — | | — | — | — | — | |
| 004 | 2 | { | C3 | E4 | G4 | C5 | } |
| 006 | — | | — | — | — | — | |
| 006 | 2 | { | C4 | E4 | G4 | C5 | } |

-continued

| TIME | DUR | | B | T | A | S | |
|---|---|---|---|---|---|---|---|
| 008 | 1 | { | A3 | F4 | A4 | C5 | } |
| 009 | 1 | { | A3 | E4 | A4 | C5 | } |
| 010 | 2 | { | B3 | D4 | G4 | G5 | } |

Representing one timestep, i.e., one-eighth of a note, and one chord, each line contains information about when the chord was started, its duration, and which note is being played in each voice. Next, determining the melody pitch by taking the soprano note without the octave, the system also determines the accent of each chord (step 1000*e*). The accent is based on the time a chord starts and the time signature of the piece. For example, in 3:4 time, the time signature for the sample listed above, a measure is 6 timesteps long because each timestep is one-eighth of a note. Thus, accented beats occur every 6 timesteps and unaccented beats occur every 2 timesteps, as indicated in the table below, wherein n is an integer representing the measure number.

| Time | Accent |
|---|---|
| 6n + 0 | ACC |
| 6n + 1 | n |
| 6n + 2 | un |
| 6n + 3 | n |
| 6n + 4 | un |
| 6n + 5 | n |

| TIME | DUR | | B | T | A | S | | MEL | ACC |
|---|---|---|---|---|---|---|---|---|---|
| 000 | — | — | — | — | — | — | | — | — |
| 004 | 2 | { | C3 | E4 | G4 | C5 | } | C | un |
| 006 | — | | — | — | — | — | | — | — |
| 006 | 2 | { | C4 | E4 | G4 | C5 | } | C | ACC |
| 009 | 1 | { | A3 | E4 | A4 | C5 | } | C | un |
| 008 | 1 | { | A3 | F4 | A4 | C5 | } | G | n |
| 010 | 2 | { | B3 | D4 | G4 | G5 | } | G | un |

Next, the system identifies a timestep with a particular known chord by attempting to match the information at each timestep with a known chord, i.e., matching if all pitches being played could be part of that known chord (step 1000*f*). For example, using the table above and a list of 120 common chords sufficient to identify 99% of all chords occurring in Bach's music, the chord at timestep=8 is identified as an F Major chord because all of its pitches are either F, A, or C. A chord unable to be identified as a known chord is marked as such, because such chord is usually the product of a passing tone or other ornament and has no significant function in the piece. Updated, the table then appears as follows.

| TIME | DUR | B | T | A | S | MEL | ACC | RT | TYPE |
|---|---|---|---|---|---|---|---|---|---|
| 000 | — | — | — | — | — | — | — | — | — |
| 004 | 2 | { C3 | E4 | G4 | C5 } | C | un | C | Major |
| 006 | — | — | — | — | — | — | — | — | — |
| 006 | 2 | { C4 | E4 | G4 | C5 } | C | ACC | C | Major |
| 008 | 1 | { A3 | F4 | A4 | C5 } | C | un | F | Major |
| 009 | 1 | { A3 | E4 | A4 | C5 } | C | n | A | Minor |
| 010 | 2 | { B3 | D4 | G4 | G5 } | G | un | G | Major |

Next, the system determines the position of each voice by comparing the pitch of each voice with the pitches allowed in the identified known chord (step 1000*g*). Thus, the current example, the chord at timestep=8 has pitches {A, F, A, C}, which correspond to positions {I1, T0, A1, A2}, resulting in the following determinations of voice positions.

| TIME | DUR | | B | T | A | S | | MEL | ACC | RT | TYPE | IN | TP | AP | SP |
|---|---|---|---|---|---|---|---|---|---|---|---|---|---|---|---|
| 000 | — | | — | — | — | — | — | | — | — | — | — | — | — | — |
| 004 | 2 | { | C3 | E4 | G4 | C5 | } | C | un | C | Major | I0 | T1 | A2 | S0 |
| 006 | — | | — | — | — | — | | — | — | — | — | — | — | — | — |
| 006 | 2 | { | C4 | E4 | G4 | C5 | } | C | ACC | C | Major | I0 | T1 | A2 | S0 |
| 008 | 1 | { | A3 | F4 | A4 | C5 | } | C | un | F | Major | I1 | T0 | A1 | S2 |
| 009 | 1 | { | A3 | E4 | A4 | C5 | } | C | n | A | Minor | I0 | T2 | A0 | S1 |
| 010 | 2 | { | B3 | D4 | G4 | G5 | } | G | un | G | Major | I1 | T2 | A0 | S0 |

Now the system identifies a function associated with each chord, by comparing the root and type of each chord with a table of common functions such as the Bach-related one described above. (step 1000*h*). When a chord is unable to be matched with any of the common functions, its function is marked as unknown, indicating that the chord may be the result of an ornament serving no harmonic function.

Finally, since not needed in the figured bass notation, information about absolute time and voice pitch is discarded, leaving the following as the output of the conversion from MIDI to figured bass (step 1000*i*).

| MEL | FUNC | IN | TP | AP | SP | DUR | ACC |
|---|---|---|---|---|---|---|---|
| C | I | I0 | T1 | A2 | S0 | 2 | un |
| C | I | I0 | T1 | A2 | S0 | 2 | ACC |
| C | IV | I1 | T0 | A1 | S2 | 1 | un |
| C | vi | I0 | T2 | A0 | S1 | 1 | n |
| G | V | I1 | T2 | A0 | S0 | 2 | un |

In addition to the chord-based conversion just described, the system can use beat-based conversion. Beat-based conversion takes advantage of harmonic functions usually changing only minimally between beats, not within a single beat. Ornaments usually relate to only half of a beat and the chords formed from them are less correlated with the surrounding music than the chords relating to the other half of the beat. The examples which include information from ornament chords tend not to correlate well with other examples and thus produce only weak rules.

The beat-based conversion method is more complex than the chord-based method because beat-based conversion examines each chord which is part of a beat and generates an example assuming that the chord was the significant chord for that beat. All examples for a timestep then have their weights normalized so that the total weight for each timestep is one. The segment of figured bass listed above would produce the following examples.

| | | |
|---|---|---|
| %NAME | 0 | Weight |
| %NAME | 1 | Function1 |
| %NAME | 2 | Function0 |
| 1.0 | — | I |
| 1.0 | I | I |
| 0.5 | I | IV |
| 0.5 | I | vi |
| 0.5 | IV | V |
| 0.5 | vi | V |

This is fairly straightforward when the examples are using only one previous beat of data. However, if an example set is built from the current beat and four previous beats, and each beat has two chords, i.e., an ornament chord and the real chord, then each beat results in a quantity of samples equal to 2 raised to the fifth power, i.e., 32 examples, each with weight 0.03125. Therefore, excepting example sets with only a small time window, a beat-based example set uses a great deal more memory than a standard chord-based example set.

Generation of example tables

Rules are generated based on examples that are created from the figured bass data. Each example includes the data necessary to agree or disagree with a potential rule, including information about previous timesteps. Examples in the table can also be weighted, so that they can count for more or less than a normal example. As indicated below in the following illustrative table, some examples have double the weight of other examples. Each example includes information about the melody and chord function used at the current timestep and at the previous two timesteps.

| | | | | | | | |
|---|---|---|---|---|---|---|---|
| %NAME | 0 | WEIGHT | | | | | |
| %NAME | 1 | Duration0 | | | | | |
| %NAME | 2 | Melody2 | | | | | |
| %NAME | 3 | Melody1 | | | | | |
| %NAME | 4 | Melody0 | | | | | |
| %NAME | 5 | Function2 | | | | | |
| %NAME | 6 | Function1 | | | | | |
| %NAME | 7 | Function0 | | | | | |
| 1.0 | 1 | C | C | C | I | I | IV |
| 1.0 | 1 | C | C | C | I | I | vi |
| 1.0 | 2 | C | C | G | I | IV | V |
| 1.0 | 2 | C | C | G | I | vi | V |
| 1.0 | 2 | C | G | E | IV | V | I |
| 1.0 | 2 | C | G | E | vi | V | i |
| 1.0 | 1 | G | E | E | V | I | iii |
| 1.0 | 1 | G | E | D | V | I | V |
| 1.0 | 2 | E | E | C | I | iii | vi |
| 1.0 | 2 | E | D | C | I | V | vi |
| 0.5 | 1 | E | C | C | iii | vi | IV |
| 0.5 | 1 | D | C | C | V | vi | IV |
| 0.5 | 1 | C | C | D | vi | IV | vii07 |
| 0.5 | 2 | C | D | E | IV | vii07 | I |
| 1.0 | 4 | D | E | D | vii07 | I | V |

To generate examples from a figured bass, the system moves a window down the list of chords, copying only certain pieces of information at each timestep. For instance, working with the sample figured bass conversion output data above to generate an example table using fields Function0 and Function1, i.e., the chord functions at the current and previous timestep, respectively, the system would produce the following. Each line is an example containing the attributes Function1 and Function0.

| Function1 | Function0 |
|---|---|
| — | I |
| I | I |
| I | IV |
| IV | vi |
| vi | V |

Derivation of rules from example tables

While generating rules from examples, the system uses a J-measure defined as shown in FIG. 4.

The J-measure represents a balance of the amount of information a rule contains and the probability that the rule will be able to be used. Since a rule is less valuable if it contains little information, the J-measure is low when the rule's probability of being correct is low, i.e., when $p(x|y)$ is about the same as $p(x)$. A rule which fires only extremely rarely is of minimal use even if is extremely conclusive. For instance, a rule base containing many always-correct rules, each useful on only one example, tends to perform extremely well on a training set but dismally in general.

An important part of the present invention is the generation technique that is used herein. The technique includes sorting the examples before extracting the rules therefrom. This has greatly improved the speed of the technique, as described herein.

Rules are generated using preset parameters which can be modified by the user if necessary. To prevent generation of rules based on too few examples, the system uses a parameter $N_{min}$ which denotes the minimum number of examples with which a rule should agree.

A list of examples $E_1, E_2, \ldots E_{NEX}$ is used to generate the rules. The value of attribute i for example $E_j$ is denoted $e_{j,i}$.

Each rule generated preferably has a minimum J-measure $J_{min}$ and fires correctly a minimum fraction of the time $p_{min}$.

On the output or right-hand side of the rule, the rule that is generated inferences an attribute $A_{RHS}$ taking integer values $a_{RHS,1}, a_{RHS,2} \ldots a_{RHS,NRHSV}$, where NRHSV stands for the number of possible RHS values. Similarly, the attributes allowed on the input or left-hand side of the rule, $A_1, A_2, \ldots A_{NLHS}$, take on $|A_i|$ integer values $a_{i,1}, a_{i,2} \ldots a_{i,NLHSV}$.

The complexity of the system is reduced using a maximum rule order $O_{max}$, representing the maximum number of attributes allowed on the left-hand side.

The system uses an array NR of size NRHSV, as described herein.

The processing according to the present invention uses substeps (FIGS. 5–8) for each possible combination of LHS attributes (steps 1020*a–b*). The system adds a hash column H to the table, each element $h_i$ of which is preferably a signed 32-bit integer corresponding to an example $E_i$ (step 1020*c*). Of course, more detailed calculations would require more bits. Using a combination of LHS attributes $A_1, A_2, A_5$, for instance, $h_i$ is determined as follows (steps 1020*d–h*).

$$h_i = e_{i,5} + |A_5|(e_{i,2} + |A_2|(e_{i,1})) \quad \text{(step 1020}g\text{)}$$

When an attribute is unknown, $h_i$ is set to −1 (step 1020*h*)

Next, the system adds a column X of indices to the table: $x_i = i$ (step 1020*i*). The table is quicksorted to group the lines of the table by hash value (step 1020*j*). Column X is actually what is sorted, because each entry in column X is only a two-byte integer. The index is only a 2-byte integer if fewer than 65535 examples are being classified. Otherwise, a 4-byte integer is preferably used. This saves on the amount of memory moved during the sort, which in turn saves time.

After sorting, the system then searches down the table to generate a preliminary rule for each hash value (steps 1020*k–l*). The elements of array NR, denoting all possible RHS values $a_{RHS}$, are used to indicate correspondence between RHS values $a_{RHS}$ and hash values h. Array element $NR[a_{RHS,j}]$ is incremented when the hash value $h_j$ for the current line is the same as the hash value h for the previous line (steps 1020*m–n*). If the two hash values are different, the system notes a preliminary rule relating to the previous hash value and then sets all element arrays NR to zero except for $NR[a_{RHS,j}]$ which is set to one.

The preliminary rules linking each hash value to one or more $a_{RHS}$ are subjected to a series of tests using the parameters mentioned above (steps 1020*o–s*). A preliminary rule is rejected if the number of examples corresponding to the hash value is less than $N_{min}$ (step 1020*r*) or if the particular $a_{RHS}$ did not occur in more than $p_{min}$ of the examples corresponding to the hash value (step 1020*q*). Finally, the system retains the rule only if its J-measure is above a J-threshold (step 1020*s*).

Rules are stored in a rule array (step 1020*t*). The rule array has a certain size, so it can only hold a predetermined number of rules. If the rule array overflows when a new rule is added (step 1020*u*), the system drops the rule with the lowest J-measure, which becomes the new J-threshold (step 1020*v*). After all examples in the table have been considered, the result is a rule base for the selected attribute.

The following is a simplified illustration further explaining the derivation of rules and using the example table and parameters listed below.

| Attr1 | Attr2 | Attr3 |
|---|---|---|
| A | A | B |
| A | B | C |
| C | B | C |
| C | A | B |
| A | B | C |
| B | B | C |
| C | C | A |
| B | A | C |

In this illustration, $N_{min}$ is set to 2, which means that a rule which correctly predicts only one example is discarded. The attribute values are found by reading across each example, e.g. , $e_{2.1}$=A, $e_{2.2}$=B, $e_{3.3}$=C. The minimum J-measure is 0.001 and the minimum fraction of the time a rule should be correct is $p_{min}$=0.50, i.e., a rule should be right half the time.

In this case, Attr3 is to be predicted using Attr1 and Attr2. In other words, $A_{RHS}$ is Attr3, taking on values $a_{RHS,1}$=A, $a_{RHS,2}$=B, $a_{RHS,3}$=C, because, in this example, Attr1 and Attr2 also have the same possible values A,B,C. Since there are 3 possible values for each attribute, ¦Attr1¦=¦Attr2¦=¦Attr3¦=3. When dealing with the attribute values as numbers, the following are used: A=0, B=1, C=2. The maximum rule order $O_{max}$ being 2, rules can appear in either of the following two forms.

| | |
|---|---|
| (1st order rule) | If (term1) then (term2) |
| (2nd order rule) | If (term1) and (term2) then (term3) |

First, the system produces hash values for the first-order rules which are of the following form.

If Attr1=(something) then Attr3=(something)

The first column in the table is an index identifying the particular example line.

| | | | | |
|---|---|---|---|---|
| 1. | A | A | B | hash = 0 |
| 2. | A | B | C | hash = 0 |
| 3. | C | B | C | hash = 2 |
| 4. | C | A | B | hash = 2 |
| 5. | A | B | C | hash = 0 |
| 6. | B | B | C | hash = 1 |
| 7. | C | C | A | hash = 2 |
| 8. | B | A | C | hash = 1 |

Sorting the examples based on hash value produces the following list.

| | | | | |
|---|---|---|---|---|
| 1. | A | A | B | hash = 0 |
| 2. | A | B | C | hash = 0 |
| 5. | A | B | C | hash = 0 |
| 6. | B | B | C | hash = 1 |
| 8. | B | A | C | hash = 1 |
| 3. | C | B | C | hash = 2 |
| 4. | C | A | B | hash = 2 |
| 7. | C | C | A | hash = 2 |

The system will try to make a rule for the examples with hash=0. This will provide the following possible rules.

If Attr1=A then Attr3=B (correct 33% of the time)

If Attr1=A then Attr3=C (correct 67% of the time)

The first of the two rules is discarded because 33%, or 0.33 as a fraction, is less than 0.50, the minimum probability $p_{min}$ allowed for a rule to be retained. Proceeding similarly for the hash values 1 and 2 provides the following retainable rules.

If Attr1=A then Attr3=C (correct 67% of the time)

If Attr1=B then Attr3=C (correct 100% of the time)

Next, generating the hash value based on Attr2 instead of Attr1 produces the following list.

| | | | | |
|---|---|---|---|---|
| 1. | A | A | B | hash = 0 |
| 4. | C | A | B | hash = 0 |
| 8. | B | A | C | hash = 0 |
| 2. | A | B | C | hash = 1 |
| 3. | C | B | C | hash = 1 |
| 5. | A | B | C | hash = 1 |
| 6. | B | B | C | hash = 1 |
| 7. | C | C | A | hash = 2 |

The following rules would be retained.

If Attr2=A then Attr3=B (correct 67% of the time)

If Attr2=B then Attr3=C (correct 100% of the time)

On the other hand, the following rule is correct sufficiently often but still needs to be discarded because it has only one supporting example, #7, and thus fails to satisfy the $N_{min}$ threshold.

If Attr2=C then Attr3=A (correct 100% of the time)

The retained rule list now appears as follows.

If Attr1=A then Attr3=C (correct 67% of the time)

If Attr1=B then Attr3=C (correct 100% of the time)

If Attr2=A then Attr3=B (correct 67% of the time)

If Attr2=B then Attr3=C (correct 100% of the time)

Next are the rules which use both Attr1 and Attr2. In this case, since Attr2 has 3 possible values, the hash value for an example is calculated by the following equation, producing the table below.

| hash = 3*(Attr1's value) + (Attr2's value) | | | | |
|---|---|---|---|---|
| 1. | A | A | B | hash = 3*0 + 0 = 0 |
| 2. | A | B | C | hash = 3*0 + 1 = 1 |
| 5. | A | B | C | hash = 3*0 + 1 = 1 |
| 8. | B | A | C | hash = 3*1 + 0 = 3 |
| 6. | B | B | C | hash = 3*1 + 1 = 4 |
| 4. | C | A | B | hash = 3*2 + 0 = 6 |
| 3. | C | B | C | hash = 3*2 + 1 = 7 |
| 7. | C | C | A | hash = 3*2 + 2 = 8 |

The only rule that is retained from this hash array using the criteria is the following, because no other hash value corresponds to a sufficient number of examples.

If Attr1=A and Attr2=B then Attr3=C (correct 100% of the time)

The resulting fully updated rule base appears as follows.

If Attr1=A then Attr3=C (correct 67% of the time)

If Attr1=B then Attr3=C (correct 100% of the time)

If Attr2=A then Attr3=B (correct 67% of the time)

If Attr2=B then Attr3=C (correct 100% of the time)

If Attr1=A and Attr2=B then Attr3=C (correct 100% of the time)

This procedure result in a rulebase. Computationally, this algorithm is very appealing because of its simplicity. Each set of LHS values is considered only once. At the time of consideration, all examples with that LHS are consecutive, so it is not necessary to search through the entire example set to determine the number of examples with which a potential rule agrees. Memory consumption is also reasonable, scaling linearly with the number of examples.

Filtering and segmentation of rules

The rule bases are preferably filtered and/ or segmented to form multiple more efficient rule bases. When it is known that a certain attribute is crucial to determining the RHS value for the rule base, filtering is used to force all rules contained therein to use that attribute. For example, the system has been used to filter out rules which disregard the current melody note in determining the current chord function.

Segmentation is done when filtering a rulebase would reduce the domain which the rulebase covers. As in filtering, rules are grouped based on the presence or absence of an attribute on their LHS. However, the rules lacking the desired attribute are placed in a second rulebase, rather than being removed. When a series of segmented rulebases is used to inference a result, the rulebase with the desired attribute is tried first. If no rules in that rulebase can fire, the rulebase lacking the desired attribute is tested. This gives the benefits of filtering since rules with the desired attribute are not overwhelmed by rules lacking the attribute. However, unlike filtering, this technique does not involve a loss of domain size, since the less desirable rules are not deleted, just prevented from firing unless there is no alternative).

Subsumption pruning of rules

After being filtered or segmented, a rule base might still contain many rules that contribute nothing, or contribute so little that they are not worth keeping. Subsumption pruning removes such unneeded rules using the technique described herein.

At step 500, rules are reviewed to determine whether two rules A and B predict the same RHS attribute and value. If so, rule B is removed from the rule base if (1) the left-hand side of rule B has more attributes than the left-hand side of rule A, (2) every attribute on the left-hand side of rule A is present and has the same value on the left-hand side of rule B, and (3) rule A is correct at least as often as rule B. Since rule B adds no new information in this case, the system becomes more efficient by removing such a rule.

Subsumption pruning should be done after any filtering and segmentation. If rule A in the previous example were filtered out, then, in retrospect, rule B should not have been removed: we have lost information.

Generation of dependence data

For the rule-based system to work properly, all rules which are allowed to fire should be independent of each other. Otherwise, one good rule could be overwhelmed by the combined weight of twenty mediocre but virtually identical rules. To prevent this problem, each rule base is analyzed to determine which rules are dependent with other rules in the same rule base. Two rules are considered dependent if both rules fire in more than half of the examples that cause at least one of them to fire.

To allow real-time independence pruning, the system maintains for each rule a list of dependent rules with lower J-measures. Independence pruning should be done in real-time, because removing all dependent rules at the time of rule base creation degrades its quality. For instance, if a rule base contains only the following two rules which are dependent and the value for $A_1$ is currently unknown, the system cannot inference a value for A at all without the second rule.

IF $A_1=a_{1,2}$ THEN $A_{RHS}=a_{RHS,3}$ with J-measure 0.013

IF $A_2=a_{2,5}$ THEN $A_{RHS}=a_{RHS,3}$ with J-measure 0.009

Given a group of dependent rules, real-time independence pruning prevents the firing of all but the rule with the highest J-measure. The system uses an array F with all values f initially set to zero, indicating at first that all rules are allowed to fire. When a rule $R_i$ fires while the system is checking rules in order of decreasing J-measure, the system adds the weight of rule $R_i$ to the overall weight of the RHS value and then sets to non-zero the values $f_j$ for all rules $R_j$ dependent with rule $R_i$.

More specifically, the operation proceeds as follows.

1. Consider two rules RA and RB which predict the same RHS and value.
2. Let A be the set of examples for which rule RA fires.
3. Let B be the set of examples for which rule RB fires.
4. Define the overlap OAB as the number of examples for which both RA and RB fire, divided by the number of examples for which either RA or RB fires.
5. If OAB<0.5, the rules are dependent.

Each rule is associated with a list of lower J-measure rules which are dependent with the rule. This list is used in real time independence pruning as described herein.

It would seem at first that it would be easiest to remove all dependent rules at the time a rulebase is created. However, this actually degrades the quality of the rulebase. As an example, assume a rulebase containing only the following two rules, and assume the rules are dependent:

IF A1=a1,2 THEN ARHS=aRHS,3 with J-measure 0.013

IF A2=a2,5 THEN ARHS=aRHS,3 with J-measure 0.009

Now assume we are trying to inference ARHS and that the value of A1 is currently unknown. Only the second rule would be able to fire. However, if we removed the second rule at the time of rulebase creation, no rules would be able to fire and we would not be able to inference a value for A. We can avoid this problem by only independence pruning those rules which can fire for a given LHS.

Rulebase interaction

An important part of musical composition is the ability to reinforce good sounds, and prevent bad sounds. Interaction buttons 60 facilitate this operation. The interaction buttons allow the contents of the rulebase to be modified based on whether the user likes or does not like a certain thing that the computer has done.

For example, if the computer makes a chord which is not pleasing the user's ear, it indicates that the rules governing that chord are not desirable. The user can press the "bad computer" button, which then adjusts the weight and/or the J-measure for that rule governing the last chord that was produced. That makes it less likely that the rule will be used subsequently. The opposite is also true—a particularly good sound can be made more likely to recur by initiating the "good computer" button.

The system operates by firing rules which have certain weights. The weights are initially assigned by the learning algorithm, based on how well the rules perform (rules which are able to fire frequently or which are right more of the time are given higher weights).

In addition to input through the MIDI keyboard, the user is also given access to two buttons. These buttons are labelled "good computer" and "bad computer", and are pressed when the user either likes or dislikes what the system is doing.

At any point, the user can press one of the buttons. These buttons affect the weights of the rules which fired to produce the notes generated by the system immediately preceding the button press.

When the "good computer" button is pressed, all the rules which predicted (voted for) the system's actual output have their weights increased. The weights can either be increased by a fixed value (for example, each rule which fired might have its weight increased by 0.01), or they can be increased by a fixed fraction (for example, each rule which fired might have its weight multiplied by 1.01).

Similarly, the "bad computer" button decreases the weights of all rules which contributed to the output which the user did not like.

For example, assume for a given timestep the following rules fire:

1. If A then B (weight 0.50)
2. If A then C (weight 0.40)

And let's say that the system picked B as the output of the system.

If the user hit the "good computer" button, we would increase the weight for rule 1 (say, to 0.51), since the user liked what that rule predicted.

If the user hit the "bad computer" button, we would decrease the weight for rule 1 (say, to 0.49), so that the system is less likely in the future to do what the user didn't like.

Figure 9:
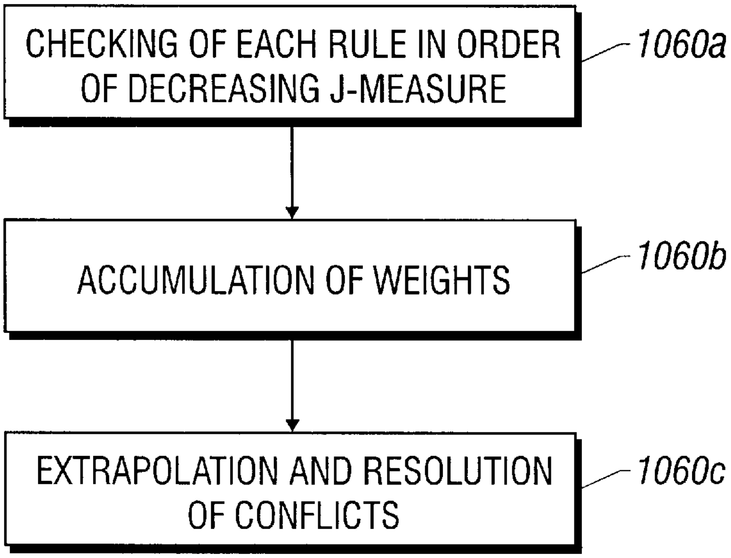
FIG. 9 is a flowchart of a method of harmonization according to the invention.

Subsumption pruning takes place during rule generation, which is when the system applies a series of rule bases to a melody to fill in a figured bass (FIG. 9). When a rule base is used to infer a RHS value during rule generation, each rule in the rule base is checked in order of decreasing J-measure (step 1060*a*). If a rule's dependence value f is zero and all of the attributes on its left-hand side are known, the rule can fire, adding its weight to the weight of the RHS value which it predicts. After all rules have had a chance to fire, the result is an array of weights for all possible values of the RHS attribute. The weights of all rules inferencing a particular RHS value are accumulated to produce the weight of that RHS value (step 1060*b*).

Resolving conflicts is necessary when two or more rules fire and inference a number of different RHS values (step 1060*c*). After exponentiating and normalizing the accumulated weights for the different RHS values to produce probabilities for each value, the system chooses one of these values at random. The system does not have to choose the answer probabilistically. If it does, it chooses the answer randomly, based on the probabilities generated by exponentiating the weights for the possible RHS values. However, we could also simply choose the most likely answer.

Summation of Rule Weights

When a rulebase is used to infer a RHS value, each rule in the rulebase is checked in order of decreasing rule J-measure. A rule can fire if it has not been marked dependent (see the next section on independence pruning) and all the attributes on its LHS are known. When a rule fires, its weight is added to the weight of the RHS value which it predicts. After all rules have had a chance to fire, the result is an array of weights for all possible values of the RHS attribute.

Independence Pruning in Real Time

As explained in the section above on generation of dependence data, all rules which fire for a given LHS should be independent. However, the inventors realized that rulebases cannot be pruned ahead of time to remove rules without losing information.

The inventor's solution to this dilemma is to keep track of which rules are dependent on other rules, and only allow rules which are still independent to fire. This technique is described below.

Start by allocating and zeroing an array F, where $f_i$ is zero if rule $R_i$ is allowed to fire. Then for each rule $R_i$ in order of decreasing J-measure, 1. If $f_i$ is non-zero, the rule is not allowed to fire. Skip to the next rule.
2. If the rule can't fire, one of the attributes on the LHS of the rule is either unknown in the input data or does not have the right value to match the input data, skip to the next rule.?????
3. The rule can fire. Add its weight to the weight for the RHS value it predicts.
4. For each rule Rj in the list of rules dependent with $R_i$, set the corresponding fj non-zero.

This technique is very fast, since it requires only array lookups and does no complex calculations. In fact, it is faster than using the same rulebase without dependency information, since if a rule is forbidden from firing the program does not spend time determining if the rule is allowed to fire. (With no dependency information, all rules are checked to see if they can fire.)

4.3 Resolution of Conflicts Between Rules Which Fire

If all rules which fire on a given example inference the same RHS value, the result of the inference is clear. But if two or more rules fire and inference a number of different RHS values, one of two algorithms must be used to resolve the conflict. In either case, the weights of all rules inferencing a given RHS are accumulated to produce the weight of that RHS.

The simpler algorithm is termed "best-only." The RHS with the highest weight is always chosen. This is the most correct method from the standpoint of probability theory. However, the inventors realized that this tends to lead to monotonous music, since a given melody will always be harmonized in the exact same fashion.

This problem led to the development of a second algorithm.

The other option is to randomly select between the possible RHS values. The accumulated weights for the RHS values are exponentiated and normalized to produce probabilities for each value. The RHS value to be used is chosen randomly based on these probabilities. It is important to note that the algorithm only chooses between values which had rules fire, not all possible values for the RHS attribute. Otherwise, there would always be a non-zero probability of picking any RHS value, even if no rules fired for that value.

4.4 What If No Rules Fire?

If no rules for a given rulebase fire, there are two possibilities. If it is not the last part of a series of segmented rulebases, the next segmented rulebase will be given a chance to fire. If the rulebase is the last in the series, or is not part of a series of segmented rulebases, the RHS value is set to the most likely value of the RHS attribute based on the attribute's prior probability distribution. This is equivalent to classifying the RHS attribute with a zeroth-order Bayesian classifier.

This problem can be avoided by training a first-order Bayesian classifier and using it as the last segment in a series of rulebases for a given RHS attribute. (For example, basing the current chord function only on the current melody pitch and setting both the minimum probability for a rule and the minimum rule J-measure to zero.) Since the first-order classifier will always have exactly one rule which fires, more information will be used to pick the RHS value than if no rules fired at all.

Conversion to MIDI

Figure 10:
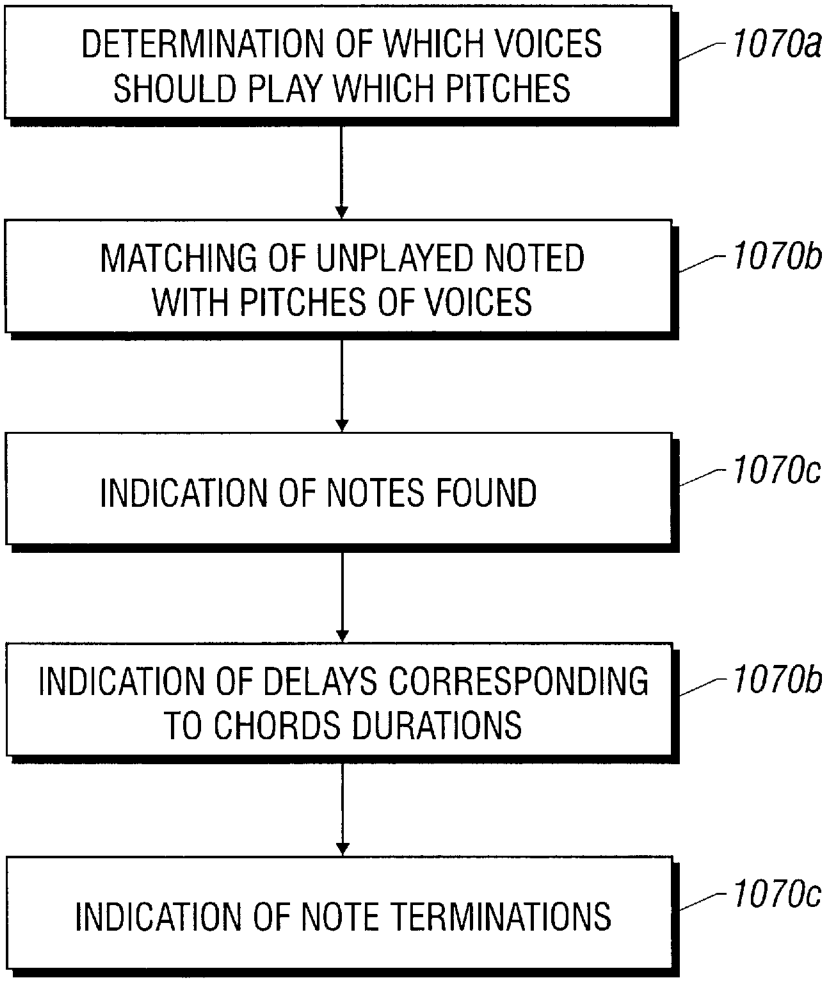
FIG. 10 is a flowchart of a method of conversion to MIDI according to the invention.

The output of harmonization is either saved in a MIDI file or played on a MIDI synthesizer, so conversion from figured bass back to MIDI is necessary (FIG. 10). MIDI data is produced for each timestep as follows. First, using the table of common functions and the voice position fields, the system determines for the chord which voices should play which pitches (step 1070*a*). Starting just below the melody note, which is known because it was used as the input to harmonization, the system then searches, once for each remaining voice, for an unplayed note matching that voice's pitch (step 1070*b*). Lastly, using MIDI code, the system indicates the notes found (step 1070*c*), the delays equal to each note's duration (step 1070*d*), and corresponding note terminations (step 1070*e*).

Given the timestep below, for example, the system uses the table of common functions to determine that the "iii" chord has the pitches {E, G, B}. Based on the positions {I2, T1 A1, S0} with the soprano pitch agreeing with the melody field, the voices play pitches {B, G, G, E}, respectively. If the melody note were at octave 5, the MIDI conversion would turn on the notes {E5, G4, G3, B2}. In either case, the system would encode a delay and a termination corresponding to a duration of one-eighth note.

| MEL | FUNC | IN | TP | AP | SP | DUR | ACC |
|---|---|---|---|---|---|---|---|
| E | iii | 12 | T1 | A1 | S0 | 1 | un |

Rulebases and Results

In the following discussion of the development of sets of rulebases, results from these sets of rule bases are analyzed and contrasted with each other. When rulebases are printed in a table, the columns have the following meanings.

| RHS Attribute | LHS Attributes | Max Order | Number of Rules | Notes |
|---|---|---|---|---|
| The attribute present on the RHS of the rule base. | Attributes present on the LHS of the rule base. Rules <u>must</u> contain any attributes in bold, and <u>may</u> contain the other attributes. | The maximum number of terms allowed on the LHS of a rule. | The number of rules in the rule base. | Significant features of the rule base. |

Unless otherwise noted, all rules should be correct at least 50% of the times they fire and should have a J-measure of at least 0.001. The rules discussed below were trained from an example set of 15 Bach harmonized chorales, which produced 818 examples by beat-based conversion and 834 examples by chord-based conversion.

The first attempt at generating harmony rules used no rule base segmentation, filtering, or pruning. The resulting rule base, called Simple1, was trained from examples using beat-based conversion.

| RHS Attribute | LHS Attributes | Max Order | Number of Rules | Notes |
|---|---|---|---|---|
| Function0 | Function1, Melody1, Melody0 | 3 | 105 | |

This initial rule base had a number of limitations. Of its 105 rules, 33 do not use the current melody note or the previous function, which lead to unresolved dissonances in the harmony. For example, if the current melody note was F-sharp and the previous function was a V7 chord, the following rule led the rule base to play a C Major chord.

12. IF Function1 V7 THEN Function0 I:0.566 0.343 0.030

The C Major chord sounds very dissonant against the F-sharp in the melody.

To correct the problems in the first rule base Simple1, all rules which did not use both the current function and previous melody note were filtered out, producing a new rule base Simple2.

| RHS Attribute | LHS Attributes | Max Order | Number of Rules | Notes |
|---|---|---|---|---|
| Function0 | Function1, Melody1, Melody0 | 3 | 72 | |

However, this smaller rule base frequently failed to fire on its input. This led to the following harmonization of the first phrase of "Hark, the Herald Angels Sing:"

| Melody | Chord | Rules Fired |
|---|---|---|
| G4 | I | 0 |
| C5 | I | 0 |
| C5 | I | 0 |
| B4 | I | 0 |
| C5 | I | 0 |
| E5 | I | 2 |

-continued

| Melody | Chord | Rules Fired |
|---|---|---|
| E5 | I | 2 |
| D5 | V | 2 |

Too much information had been lost, so no rules were fired for over half the timesteps, producing an extremely dull harmony. The smaller rule base sounded worse, because dissonances were created when no rules fired and the C-Major chord picked by the Bayes classifier of order zero was played against notes such as F and B.

The solution to the problems that the inventors recognized with respect to the first two rule bases lay in segmenting the learned harmony rules into three rule bases, together called Major4 and listed in the table below. These rule bases were the first to be used in real time to accompany a musician. The musician played only the melody note and the program responded with the other three voices a fraction of a second later.

The first rule base contained the best rules, used in the Simple2 set. If no rules from that set fired, the second rule base tried to fire rules which used at least the current melody note. As mentioned above with respect to segmentation, this method allowed the better rules a chance to fire without being overwhelmed by rules using less significant information, while preserving all of the information contained in the full rule base.

If no rules fired in any of the three initial rule bases, which happened about 25% of the time, a first-order Bayesian classifier would determine the current function based on the current melody note. This ensured that the chord played would be at least consonant with the melody note.

These rules worked well enough that additional rule bases were generated to determine the positions of the bass, alto, and tenor voices so that the harmonized melody could be converted back into MIDI data and played, as described above. Bayesian classifiers were not needed in addition to these rule bases, because (1) the generated rules spanned a much larger portion of the input space, i.e., only rarely did no rule fire, and (2) because an error in a single voice position is much less noticeable than a bad chord function.

| RHS Attribute | LHS Attributes | Max Order | Number of Rules | Notes |
|---|---|---|---|---|
| Function0 | Function1, Melody1, Melody0 | 3 | 172 | First of four rule bases used to predict harmony. |
| Function0 | Melody1, Melody0 | 3 | 34 | |
| Function0 | Function1, Melody1 | 3 | 37 | |
| Function0 | Melody0 | 1 | 8 | First-order Bayesian classifier. |
| Inversion0 | Function1, Inversion1, Function0 | 3 | 145 | |
| Alto0 | Function1, Alto1, Function0, Inversion0 | 3 | 472 | |
| Tenor0 | Tenor1, Function0, Inversion0, Alto0 | 3 | 341 | |

Some of the significant rules in these rule bases included the following.

The first rule is from the first Function0 rule base.

| | | | | |
|---|---|---|---|---|
| 1. | IF | Melody0 E | THEN | Function 0 I 0.83 0.89 0.0601 |
| | AND | Function1 V | | |

This transition, from G Major to C Major, is the strongest cadence or ending in classical harmony.

| | | | | |
|---|---|---|---|---|
| 3. | IF | Melody0 F | THEN | Function 0 IV 0.98 3.12 0.0499 |
| | AND | Function1 V | | |

This is another common transition, from G Major to F Major.

The following rule is from the Inversion0 rule base.

| | | | | |
|---|---|---|---|---|
| 1. | IF | Function1 V | THEN | Inversion0 I1 0.98 1.59 0.0255 |
| | AND | Function0 IV | | |

Combined with rule 3 above, this rule places the function V to function IV transition in first inversion.

| | | | | |
|---|---|---|---|---|
| 3. | IF | Function1 V | THEN | Inversion0 I0 0.86 0.20 0.0179 |
| | AND | Function0 I | | |

Combined with rule 1 above, this places the function V to function I cadence in root position, which is the strongest position for an ending chord.

26. IF Function0 vii07 THEN Inversion0 I1 0.53 0.17 0.0098

This rule places diminished 7th chords in first inversion, where they are placed in classical harmony. This rule has a lower J-measure than the other rules because diminished 7th chords do not appear very often, which creates a low value for p(y).

With the "best-only" method turned off as described above, the system was able to produce different harmonies for a given melody by randomly choosing among possible RHS values. For example, the melody C-A-B-G-D-C could be harmonized as follows.

| | | |
|---|---|---|
| C Major | I0 A0 T2 C5 : I | { C3 G3 C4 CS } |
| D Major | I0 A2 T0 A5 : V/V | { D3 D4 A4 A5 } |
| G Major | I0 A1 T2 B5 : V | { G3 D4 B4 B5 } |
| G Major | I1 A2 T0 G5 : V | { B3 G4 D5 G5 } |
| G Major | I0 A1 T2 D5 : V | { G3 D4 B4 D5 } |
| C Major | I0 A0 T2 ES : I | { C4 G4 C5 ES } |

Alternatively, the melody could be harmonized as shown below.

| | | |
|---|---|---|
| C Major | I0 A0 T2 C5 : I | { C3 G3 C4 C5 } |
| D Major | I0 A2 T0 A5 : V/V | { D3 D4 A4 A5 } |
| G V7 | I0 A3 T3 B5 : V7 | { G3 F4 F5 B5 } |
| C Major | I0 A0 T1 G5 : I | { C4 E4 C5 G5 } |
| B dim7 | I1 A3 T1 D5 : vii07 | { D3 D4 G#4 D5 } |
| A Minor | I0 A1 T0 C5 : vi | { A2 A3 C4 C5 } |

The two harmonizations are quite different: in the six-note melody above, there are three places where the program has a choice between two functions for a given chord.

Figure 11:
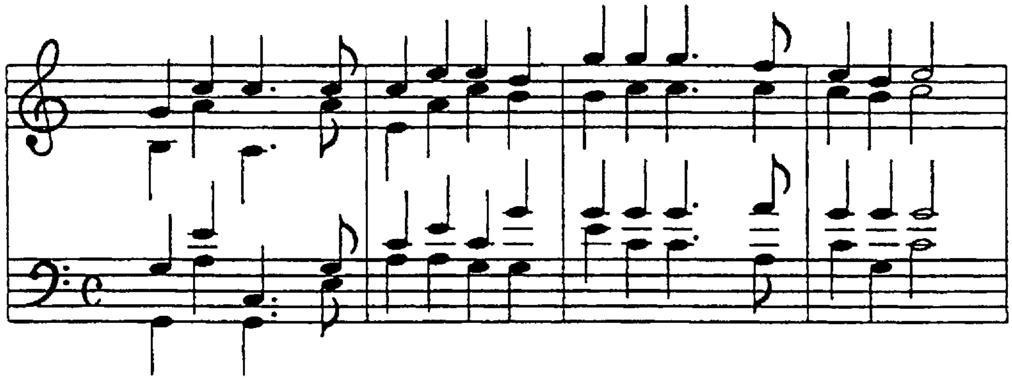
FIGS. 11–14 are musical charts representing products of music composition according to the invention.

Another piece harmonized by these rule bases, the first phrase of "Hark! the Herald Angels Sing" shown in FIG. 11, has a generally high-quality sound—there are no unresolved dissonances. However, the voice-leading in the piece is poor in places. The third chord, a C Major chord, has notes {C, C, C, G}. The third note of the chord, E, is absent, leading to a hollow sound. This problem was addressed in the next set of rule bases, called Major4*a* and discussed below.

In an attempt to correct the voice leading problems of the Major4 rule base, a rule base which determined the soprano voice position was added to the set of rule bases. Since the current function and melody pitch uniquely determine the soprano voice position, the generated rule base covered the entire input domain and was always correct.

The soprano voice position was added to the possible LHS attributes for the rule bases for the other voice positions. This permitted rules for the tenor which would allow the tenor to fill in a missing chord pitch. The tenor rules were no longer forced to include the chord position. The addition of the soprano voice allows rules such as the following.

| | | | | | |
|---|---|---|---|---|---|
| 2. | IF | Soprano0 | S1 | THEN Tenor0 T2 : 0.888 1.024 | 0.132 |
| | AND | Alto0 | A0 | | |
| | AND | Inversion0 | I0 | | |
| 6. | IF | Soprano0 | S0 | THEN Tenor0 T1 : 0.901 1.239 | 0.079 |
| | AND | Alto0 | A2 | | |
| | AND | Inversion0 | I0 | | |
| 13. | IF | Soprano0 | S2 | THEN Tenor0 T3 : 0.634 1.326 | 0.070 |
| | AND | Alto0 | A1 | | |
| | AND | Inversion0 | I0 | | |
| | AND | Tenor1 | T0 | | |

These rules show the tenor rule base filling in chord pitches which are not present in the other rule bases. The very high accuracy of the first two rules (88.8% and 90.1%) indicates that it is important to fill out a chord's pitches.

The number of rules is then reduced by subsumption pruning of the rulebases, resulting in the Major4*a* set shown in the table below. This pruning removed from 5% to 30% of the rules from any given rule base without affecting its classification accuracy or input domain.

| RHS Attribute | LHS Attributes | Max Order | Number of Rules | Notes |
|---|---|---|---|---|
| Function0 | Function1, Melody1, Melody0 | 3 | 124 | |
| Function0 | Melody1, Melody0 | 3 | 32 | |
| Function0 | Function1, Melody1 | 3 | 26 | |
| Function0 | Melody0 | 1 | 8 | First-order Bayesian classifier. |
| Soprano | Melody0, Function0 | 2 | 60 | Direct equivalence between LHS and RHS. |
| Inversion0 | Function1, Inversion1, Function0, Soprano0 | 4 | 133 | |
| Alto0 | Function1, Alto1, Function0, Inversion0, Soprano0 | 4 | 309 | |
| Tenor0 | Tenor1, Function0, Inversion0, Alto0, Soprano0 | 4 | 434 | |

Figure 12:
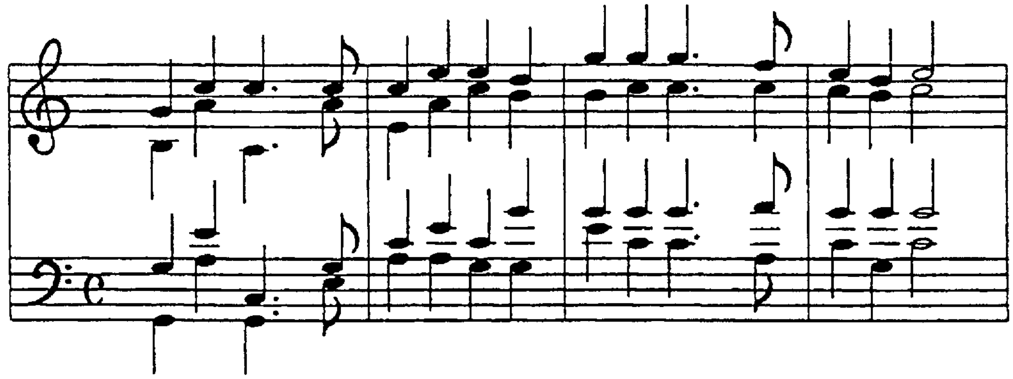

FIG. 12 shows the harmony for "Hark! The Herald Angels Sing" generated by the new rules. The third chord, which used the voice arrangement {C,C,C,G} under Major4, uses {C,G,E,G} under Major4*a* and contains all three pitches present in the C Major chord. Furthermore, the new rules doubled the G note, as is proper for a chord present in second inversion.

Figure 13:
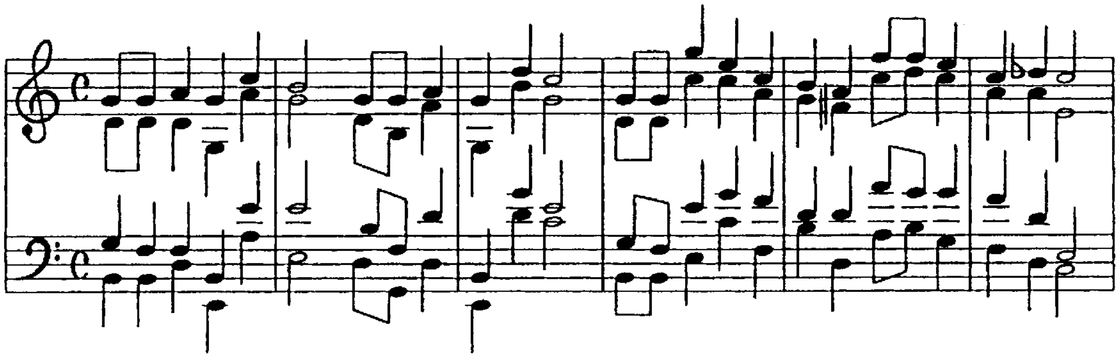

Despite the progress in voice-leading, the Major4*a* rules still had limitations. For instance, the rules referred back in time only to the previous chord, and did not use information about the accent on the current chord. This meant that the rule base could not predict when a piece of music was ending, and thus often fumbled the final cadence. An example of this problem is shown in FIG. 13 in the harmony produced for "Happy Birthday." The harmony ends on a "vi" or "A Minor" chord, which, being a minor chord, lends a sad feel to the end of the piece. This is not an appropriate way to end a piece written in a major key.

The Major7*a* set of rule bases, listed below, was allowed to use more information about the accents of current and previous chords. "FunctionLA" stands for the function of the last chord which started on an accented beat. "FunctionLB" and "InversionLB" represent the function and inversion, respectively, of the last chord which started at the beginning of any beat. "Accent0" means the accent on the current chord. "Function1" still stands for the function of the immediately preceding chord.

With the Bach chorales used as input, either FunctionAB or FunctionLB did not match a common function 14% of the time. The method could not find a match for Function1 in 25% of the examples. Since unmatched functions typically indicate that an ornament is present, this result confirms that ornaments occur more frequently in the middle of beats.

Rules were required to be correct at least 30% of the time they fired, which was lower than the 50% required by previous sets of rule bases. However, the largest prior probability for Function0 was 24%, so a rule which was correct 30% of the time still provided useful information. All rule bases were also subsumption pruned.

| RHS Attribute | LHS Attributes | Max Order | Number of Rules | Notes |
|---|---|---|---|---|
| Function0 | FunctionLA, FunctionLB, | 5 | 175 | First of four |

-continued

| RHS Attribute | LHS Attributes | Max Order | Number of Rules | Notes |
|---|---|---|---|---|
| | Function1, Melody1, Accent0, Melody0 | | | segments of Function0 rules. |
| Function0 | (FunctionLA and/or FunctionLB), Melody1, Accent0, Melody0 | 5 | 282 | |
| Function0 | Melody1, Accent0, Melody0 | 5 | 83 | |
| Function0 | FunctionLA, FunctionLB, Function1, Melody1, Accent0 | 5 | 361 | |
| Soprano0 | Function0, Melody0 | 2 | 60 | Direct equivalence between LHS and RHS. |
| Inversion0 | FunctionLB, Function1, Inversion1, Function0, Soprano0 | 5 | 332 | First of two segments of Inversion0 rules. |
| Inversion0 | FunctionLB, Function1, Inversion1, Soprano0 | 5 | 287 | |
| Alto0 | Function1, Alto1, Function0, Inversion0, Soprano0 | 5 | 820 | |
| Tenor0 | Tenor1, Function0, Inversion0, Alto0, Soprano0 | 5 | 815 | |

Rules had more possible LHS attributes and higher order rules were permitted, so enough rules were generated that at least one rule would fire for each desired RHS attribute in almost all cases. Therefore, a Bayesian classifier was not needed as a safety net for determining the chord function.

```
    The script for determining the major7 follows.
Lines which start with ; are comments.
;     Read examples from the example list
;
load exlist major7 from major7.el
;
;     Set defaults
;
;     At most 5 clauses on "IF" side of a rule
default rule order 5
;     Unless otherwise specified, learn using the "major7"
;     example list we just read in
default exlist major7
;     Learn up to 2048 rules at a time
default maxrules 2048
;     Rules must be right at least 30% of the time
default mincorrect 0.3
;     Rules must have a J-measure >= 0.001
default minpriority 0.001
;==========================================================
=====
;     Extract and save attributes
;
copy attrbase attr7 from major7
save attr7 to attr7.att
;==========================================================
=====
;     Learn rules for Harmony0
;
learn harm7_2 {
    ;     These attributes CAN appear on the left-hand side
    lhs Melody0
    lhs Melody1
    lhs Function1
    lhs FunctionLB
    lhs FunctionLA
    lhs Accent0
    ;     This is what we want to predict
    rhs Function0
}
;
;     Now we want to segment the harmony rules into 3
different
;     sets, based on what attributes they contain.
;
;
```

```
;      Ruleset #3 - doesn't use current melody
;
;      Copy the full set of rules
copy rulebase harm7__3 from harm7__2
;      Remove any rules which use Melody0
filter harm7__3 never Melody0
;      Do subsumption pruning
prune harm7__3
;      Save the rulebase
save harm7__3 to harm7__3.rul
;      And free up its memory
free harm7__3
;      Rulesets #1,2 - use current melody and last
functions
;      Now remove all the rules which ended up in harm7__3
filter harm7__2 always Melody0
;      And resize the rulebase (this frees up the memory
which
;      was used by the rules we just filtered out)
resize harm7__2
;
;      Ruleset #1 - use either Function1, FunctionLB, or
FunctionLA
;
;      In order to handle the "OR" in the statement above,
we need
;      to make three sub-rulebases - each contains rules
which use
;      one of the Function attributes.
copy rulebase h71a from harm7__2
filter h71a always Function1
prune h71a
resize h71a
copy rulebase h71b from harm7__2
filter h71b always FunctionLB
prune h71b
resize h71b
copy rulebase h71c from harm7__2
filter h71c always FunctionLA
prune h71c
resize h71c
;      Now we combine the three sub-rulebases into one big
rulebase.
combine h71a and h71b into h71d
free h71a
free h71b
combine h71c and h71d into harm7__1
free h71c
free h71d
;      Once they're combined, we can subsumption-prune the
result.
prune harm7__1
save harm7__1 to harm7__1.rul
free harm7__1
;      Ruleset #2 - doesn't use any functions
filter harm7__2 never Function1
filter harm7__2 never FunctionLB
filter harm7__2 never FunctionLA
prune harm7__2
save harm7__2 to harm7__2.rul
free harm7__2
;==========================================================
=====
;      Learn rules for Soprano0 (should do perfectly -
there's
;      a 1:1 mapping between Function0+Melody0 and
Soprano0)
;
learn sopr7__1 {
      ruleorder 2
      mincorrect 0.2
      minpriority 0.000001
      lhs Melody0
      lhs Function0
      rhs Soprano0
}
filter sopr7__1 always Melody0
filter sopr7__1 always Function0
save sopr7__1 to sopr7__1.rul
free sopr7__1
```

-continued

```
;============================================================
=====
;    Learn rules for Inversion0
;
learn invr7_2 {
     lhs Function0
     lhs Soprano0
     lhs Inversion1
     lhs Function1
     lhs InversionLB
     lhs FunctionLB
     lhs Accent0
     rhs Inversion0
}
;    Ruleset #1 - use current function
copy rulebase invr7_1 from invr7_2
filter invr7_1 always Function0
prune invr7_1
save invr7_1 to invr7_1.rul
free invr7_1
;    Ruleset #2 - don't use current function
filter invr7_2 never Function0
prune invr7_2
save invr7_2 to invr7_2.rul
free invr7_2
;============================================================
=====
;    Learn rules for Alto0
;
learn alto7_1 {
     lhs Function0
     lhs Soprano0
     lhs Inversion0
     lhs Function1
     lhs Alto1
     lhs Accent0
     rhs Alto0
}
prune alto7_1
save alto7_1 to alto7_1.rul
free alto7_1
;============================================================
=====
;    Learn rules for Tenor0
;
learn tenr7_1 {
     lhs Function0
     lhs Soprano0
     lhs Alto0
     lhs Inversion0
     lhs Function1
     lhs Tenor1
     rhs Tenor0
}
prune tenr7_1
save tenr7_1 to tenr7_1.rul
free tenr7_1
;    We're done with this section of the learning, so
exit this script.
end
```

Figure 14:
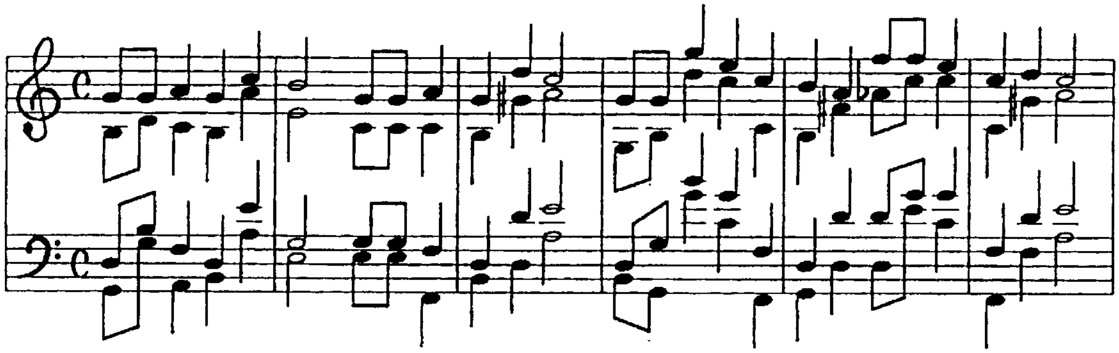

This Major7*a* set of rule bases produces the harmony for "Happy Birthday" shown in FIG. 14. Unlike Major4*a*, Major7*a* directs that the piece should end on a "I" or C Major chord, which is a more solid ending for a piece in a major key.

The Major7*b* set of rule bases, shown in the table below, is identical to the Major7*a* set except for the addition of dependency data for real time independence pruning. The number of dependent rule pairs for each rule base is shown in the table.

| RHS Attribute | LHS Attributes | Number of Rules | Number of Dependent Rules | Average Pairs Per Rule |
|---|---|---|---|---|
| Function0 | FunctionLA, FunctionLB, Function1, Melody1, Accent0, Melody0 | 175 | 175 | 1.0 |
| Function0 | (FunctionLA and/or FunctionLB), Melody1, | 282 | 249 | 0.9 |

-continued

| RHS Attribute | LHS Attributes | Number of Rules | Number of Dependent Rules | Average Pairs Per Rule |
|---|---|---|---|---|
| Function0 | Accent0, Melody0 Melody1, Accent0, Melody0 | 83 | 32 | 0.4 |
| Function0 | FunctionLA, FunctionLB, Function1, Melody1, Accent0 | 361 | 553 | 1.5 |
| Soprano0 | Function0, Melody0 | 60 | 0 | 0.0 |
| Inversion0 | FunctionLB, Function1, Inversion1, Function0, Soprano0 | 332 | 694 | 2.1 |
| Inversion0 | FunctionLB, Function1, Inversion1, Soprano0 | 287 | 597 | 2.1 |
| Alto0 | Function1, Alto1, Function0, Inversion0, Soprano0 | 820 | 1992 | 2.4 |
| Tenor0 | Tenor1, Function0, Inversion0, Alto0, Soprano0 | 815 | 2868 | 3.5 |

The position-oriented rule bases, which have more LHS attributes which take only a few values, end up with higher numbers of dependent rule pairs. This leads to situations such as the following. If the Tenor0 rule base contains the rule IF Soprano0=S2 THEN Tenor0=T1 then the Tenor0 rule base is likely to contain one or more of the following rules

| | | | |
|---|---|---|---|
| IF | Soprano0 = S2 | THEN | Tenor0 = T1 |
| AND | Tenor1 = T0 | | |
| IF | Soprano0 = S2 | THEN | Tenor0 = T1 |
| AND | Tenor1 = T1 | | |
| IF | Soprano0 = S2 | THEN | Tenor0 = T1 |
| AND | Tenor1 = T2 | | |
| IF | Soprano0 = S2 | THEN | TenorO = T1 |
| AND | Tenor1 = T3 | | |

because a subset of examples with a specified value for Tenor1 has a sufficiently large number of samples to force up the J-measure for rules with that Tenor1 value on the LHS.

The addition of real time independence pruning speeds up harmonization because fewer rules in each rule base need to be checked to see if they can fire. However, the harmony generated by the newer rule bases does not differ significantly from that of the Major7*a* rule bases.

The following script is used:

```
; MAJOR7B.INP - generates dependence info for major7 rules
; We did this as a separate script so I could look at the
intermediate
; steps - there's no reason we couldn't do it in the same
script that
```

-continued

```
; we learned the rules in.
;
;
; Load our examples and attributes.
load exlist m7 from major7.el
copy attrbase a7 from m7
default attrbase a7
;
; Now we load in each rulebase and generate its dependency
information.
;
; Load the rulebase
load rulebase r from r\harm7_1.rul
; Generate its dependenay information
gendep r with m7 0.5
; And save it
save r to harm7_1b.rul
; Then free up the memory it was using.
free r
load rulebase r from r\harm7_2.rul
gendep r with m7 0.5
save r to harm7_2b.rul
free r
load rulebase r from r\harm7_3.rul
gendep r with m7 0.5
save r to harm7_3b.rul
free r
load rulebase r from r\harm7_4.rul
gendep r with m7 0.5
save r to harm7_4b.rul
free r
load rulebase r from r\invr7_1.rul
gendep r with m7 0.5
save r to invr7_1b.rul
free r
load rulebase r from r\invr7_2.rul
gendep r with m7 0.5
save r to invr7_2b.rul
free r
load rulebase r from r\alto7_1.rul
gendep r with m7 0.5
save r to alto7_1b.rul
free r
load rulebase r from r\tenr7_1.rul
gendep r with m7 0.5
save r to tenr7_1b.rul
free r
end
```

File Format

The following describes a specification of a preferred data file format for transmitting information about examples and rules among different applications. The format allows for expansion of the specification while still permitting older applications to read newer and expanded data files. Any application which implements the required portions of the specification is able to read and use those portions of any data file written using any version of the specification.

The preferred file extension is ".IPR," which stands for Itrule Portable Rule ("IPR") file.

An IPR file includes ASCII text. The first ten characters of an IPR file should be "#IPRSTART#" which permits application readers to detect and reject easily files which are not IPR files. The file terminates with the text string "#IPREND#" followed by an End-of-File ("EOF") character, which is 0x1A in hexadecimal notation. Lines can terminate with any combination of carriage-return (0x0D) and line feed (0x0A) characters. The line length limit is 16384 characters.

IPR files can consist of any number of sections—for example, an IPR file with zero sections is meaningless, but permissible. All identifiers and variable names are case-insensitive. Identifiers and variable names should begin with a letter, i.e., A to Z, and should not contain space characters or any of the following characters:

{ }=, “<|>

Identifiers and variable names can be up to 31 characters long. Values can be up to 255 characters long.

Each section of the data file has the following form.

```
        SECTIONTYPE {
                . . . data for section . . .
        }
```

The “SECTIONTYPE” identifier is not required to be on the same line as the open brace and no space is required between the identifier and the open brace.

Under the specification, a program which does not recognize a section type should ignore it. Sections can be nested, e.g., a “RULE” section can be nested inside a “RULEBASE” section. A nested section is referred to as a “subsection.” Within a section, all variables should come first, followed by any subsections.

Comment notation is similar to that of the programming language C++. Single-line comments begin with two slashes “//” and extend to the end of the line, as shown below.

```
// This is a comment
```

Comments with multiple lines, such as the sample comment below, begin with slash-star “/*” and end with star-slash

```
/*      this is a commment
        which can extend
        over multiple lines */
```

Any text denoted a comment should be ignored by programs.

Variable assignments have the following form.

```
variable=value
```

A value containing spaces or tabs should be enclosed in double-quotes, as shown below.

```
variable=“multi word value”
```

Spaces between the variable, equals sign “=”, and the value are optional. A program reading an assignment should be able to understand the assignment with or without the spaces.

Some variables are optional and can be absent from an IPR file—a program is not required to be able to read or write these variables. A program encountering a variable unknown to it should be able to pass over that variable without disruption.

A required variable is indicated by a denotation “(required)” which follows the variable’s definition. All reader applications and writer applications should process these variables.

Variables have assigned types which follow their definitions: “string” denotes an ASCII string, “integer” indicates a 4-byte signed integer, and “float” signifies a floating point number.

Some section types are pre-defined. A “RULEBASE” section is used to store lists of rules and consists of a series of variables followed by a series of rule sections, as shown below.

```
    RULEBASE     {
    // variables:
    NAME = string
    COUNT = integer
    ATTRIBUTESFROM = string
    DEPENDENCYCOUNT = integer (*Enumerates the size of
        dependency table*)
    . . .
    // list of rules:
    RULE {
        . . . rule data . . .
    }
    RULE {
        . . . rule data . . .
    }
    . . .
    // realtime dependenay table
    DEPENDENCYTABLE {
        . . . dependency data . . .
    }
}
```

In the “RULEBASE” section, the variable “NAME (string, required)” has the rule base’s name, which can be up to 256 characters in length. A variable “DEPENDENCYCOUNT (integer, optional)” indicates the number of elements in the real-time dependency pruning table and should be present if the “DEPENDENCYTABLE” subsection is present. The number of rules in the rule base is stored by the variable “COUNT (integer, required).”

An attribute data base, in terms of which the rule base is defined, should precede the rule base in the IPR file and is indicated by variable “ATTRIBUTESFROM (string, required).”

Two sections contained in a “RULEBASE” section are “DEPENDENCYTABLE (optional)” and “RULE (required).” The “DEPENDENCYTABLE” section contains real-time dependency information for the rule base and is stored as a series of integers separated by spaces. The “RULE” section stores a single rule and is contained in a “RULEBASE” section.

A “RULE” section has the structure shown below.

```
RULE    {
        PRIORITY = float
        WEIGHT = float
        J-MEASURE = float
        LITTLE-J = float
        P (FIRE) = float
        P (CORRECT) = float
        DEPENDOFFS = integer
        . . .
        IF {
            // permissible if clauses:
            {attr = value}
            {attr <> value}
            {attr > value }
            {attr < value}
            {attr >= value}
            {attr <= value}
        }
        IFOR {}
        IFAND {}
        THEN {
            {attr = value | weight}
            {attr = value | weight}
            . . .
        }
        THENDISTR {
            {attr | weight1 weight2 weight3 . . .
        }
}
```

An example of an “IF” clause is shown below.

-continued

```
// if (a1=v1 and a2=v2 and (a3=v3 or a4=v4))
IFAND {
        {a1 = v1}
        {a2 = v2}
        IFOR {
            {a3 = v3}
            {a4 = v4}
        }
}
```

In a "RULE" section, the variable "PRIORITY (float, optional)" indicates the rule's priority, in arbitrary units. Rule weight is signified by the variable "WEIGHT (float, optional)" which stores the logarithm of the rule's transition probability. The variables "J-MEASURE (float, required)" and "LITTLE-J (float, optional)" contain the rule's J-measure and j-measure, respectively. The probability, based on the training examples, that the rule will be able to fire is indicated in the variable "P(FIRE) (float, optional)." Related variable "P(CORRECT) (float, optional)" represents the probability, again based on the training examples, that the rule, if able to fire, will be correct. If a dependency table is used, the variable "DEPENDOFFS (integer, optional)" shows the offset position, in the realtime dependency table, of the rule's dependency information.

Subsection "IF (required)" has a standard left-hand side with "attribute =value" pairs and should not have nested boolean expressions. The attribute and value should conform to the specifications for variables.

Subsection "IFAND (optional)" is equivalent to subsection "IF." Subsection "IFOR (optional)" returns a boolean value of "TRUE" if one or more of its "attribute=value" pairs matches the input data. Subsections "IFAND" and "IFOR" can be nested within each other.

The subsection "THEN (required)" has a standard right-hand side with "attribute=value/weight" sets. The "weight" field, which is optional, represents the fraction of the total rule weight, indicated by the WEIGHT variable discussed above, which should be added to the logarithmic probability for the RHS value. The "weight" fields are not required to add up to 1.0. An omitted "weight" field is treated as a "weight" field of 1.0. As mentioned above, the attribute and value should conform to the specifications for variables. Distribution rules can be represented by a "THEN" subsection which has one triplet for each possible RHS value or by a "THENDISTR (optional)" subsection which specifies an attribute and lists the weights for each value of that attribute in order.

As mentioned above, each rule base is defined in terms of an attribute base. An "ATTRBASE" section, which has the form shown below, stores an attribute base, i.e., a series of attributes, just as a "RULEBASE" stores a series of rules.

```
ATTRBASE {
        // variables:
        NAME = string
        COUNT = integer
        . . .
        // list of attributes:
        ATTRIBUTE {
            . . . attribute data . . .
        }
        ATTRIBUTE {
            . . . attribute data . . .
```

-continued

```
        }
        . . .
}
```

The "NAME (string, required)" variable in the attribute base stores the attribute base's name, which can be up to 256 characters in length. The number of attributes in the attribute base is represented by COUNT (integer, required).

The "ATTRIBUTE (required)" subsection has the structure shown below.

```
ATTRIBUTE {
    // variables:
    NAME = string
    COUNT = integer
    UNKNOWN = float
    . . .
    // values
    VALUES {
        {value | probability}
        {value | probability}
        {value | probability}
        . . .
    }
}
```

The variables of the "ATTRIBUTE" subsection include the "NAME (string, required)" variable which stores an attribute name of up to 256 characters in length and the "COUNT (integer, required)" variable which represents the number of values for the attribute. Another variable "UNKNOWN (float, optional)" indicates the fraction of the attribute's values that are unknown. A list of values and a probability for each value is stored by the "VALUES (required)" variable.

The "RBASELIST" subsection is a section containing a list of rule bases and has the structure shown below.

```
RBASELIST {
    // variables:
    NAME = string
    COUNT = integer
    // filename far attrbase
    ATTRBASE = string
    // rulebases in order
    RBLIST {
        {name | flag1 flag2. . .}
        {name | flag1 flag2. . .}
        . . .
    }
}
```

Like other sections, the "RBASELIST" section has a "NAME (string, required)" variable and a "COUNT (integer, required)" variable. The "COUNT" variable represents the number of rule bases in the list. The common attribute base for the rule base list is indicated by the variable "ATTRBASE (string, required)."

The "RBASELIST" section also has a subsection "RBLIST (required)" which stores a list of data file names for rule bases and flags for each rulebase.

Software Interface

The following describes a specification of a preferred Windows operating system interface between a shared rule-based inferencing software engine (the "server") and software applications which use the engine to learn and evaluate rule bases for real-time control (the "clients"). All applications, client-based and server-based, register three custom message numbers for communication, and use them to communicate commands and results between each other. The message numbers used are returned by the following actions.

```
AdmireControlMsg = RegisterWindowMessage ("ADMIRE/WIN
Control");
AdmirePacketMsg = RegisterWindowMessage ("ADMIRE/WIN Packet");
AdmireFreePtrMsg = RegisterWindowMessage ("ADMIRE/WIN
FreePtr");
```

Messages are sent between client and server using Windows procedure "PostMessage ()." This allows the rule base engine and clients to function asynchronously. Applications should not send messages using Windows procedure "SendMessage ( )," which, unlike "PostMessage ( )," does not give up control in the Windows cooperative multitasking environment.

When a message is sent, Windows structure "wParam" always contains the handle of the sending window, so the receiver can easily determine where to send a reply. The value of Windows structure "1Param" depends on the type of message being sent.

A Control Message is used to initiate or terminate a communication or to send other application-level control messages. Accordingly, "1Param" is set as shown in the following table.

| HIWORD | LOWORD | Meaning |
|---|---|---|
| 1-HELLO | 0 | Client is broadcasting a request to all servers to initiate communication. |
| | 1 | Free server is responding to a client. |
| | 2 | Busy server is responding to a client. |
| | 3 | Client wants this server - server become busy. |
| | 4 | Client does not want this server - server becomes free. |
| 2-BYE | 0 | Client or server is requesting connection be terminated. |

A Packet Message is used to send packets between the client and server once communication has been established. In this case, "1Param" is a pointer to the packet data, which lies in global shared memory. Once a packet has been passed to another program via this interface, the sending program should not attempt to access the packet data. When the receiving program is done with the packet, it should send a Free Pointer Message back to the sender so that the sender can free the associated memory.

The Free Pointer Message is sent to the original sender of a packet, signifying that the original receiver is done with the packet and that the memory associated with the packet can be freed. "1param" should point to the memory to be freed.

All communications packets consist of a series of data structures called "chunks." Each chunk has the form shown in the table below.

| Addresses | Type | Contents |
|---|---|---|
| 0000–0003 | ASCII chars | Chunk type, not a null-terminated string. |
| 0004–0007 | 32-bit integer | Length of chunk including the header. |
| 0008–0009 | 16-bit integer | Offset of start of chunk body from start of chunk. |
| 000A–nnnn | Various | Chunk body. |

All packets should begin with a header chunk "*HDR" and end with an end chunk "*END." Encoding the offset of the chunk body as noted in the table above allows more fields to be added to the chunk header.

Each packet should handle only one subject, e.g., loading a series of files or learning a rule base. It is preferable to send multiple small packets instead of one large complex packet, so that the sending of information does not entail large delays which can disrupt the multitasking environment.

All applications should be able to process all chunk types beginning with an asterisk "*." Processing other chunk types is optional. If an application does not understand one or more chunks in a packet, it should send an "*UNK" chunk back to the sender of the packet as part of any reply to the packet.

The "*HDR" header chunk is the first chunk in any packet and contains subfields in the chunk body as indicated in the following table.

| Addresses | Type | Contents |
|---|---|---|
| 0000–0003 | 32-bit integer | Packet ID number. ID numbers should be unique within a particular session. |
| 0004–0007 | 32-bit integer | ID of the packet responding to, or 0 if this packet is not responding to a previous packet. |
| 0008–0009 | 16-bit integer | Number of chunks in this packet, including the "*HDR and *END chunks." |
| 000A–000B | 2 8-bit integers | Version of the specification supported, in the form A.B. |

The "*UNK" chunk lists all the chunk types in a previous message that were not understood by the receiver. The chunk body thus consists of 4 n bytes, where n chunk types were not understood, since each chunk type is a 4-byte string. This allows the sender to compensate for an older receiver which does not understand newer chunk types.

An "*ERR" chunk indicates that a chunk was malformed, was missing a required field, or was otherwise unintelligible. The body of the "*ERR" chunk contains the fields listed in the following table.

| Addresses | Type | Contents |
|---|---|---|
| 0000–0003 | 32-bit integer | Address of the bad chunk in the referenced packet. |
| 0004–0007 | 32-bit integer | Offset of the error in the chunk. |
| 0008–0009 | 16-bit integer | Type of error according to the following list. |

| Error Type | Meaning |
|---|---|
| 0000 | Unexpected end of packet. |
| 0001 | Missing required field. |
| 0002 | Invalid value for field. |
| 7FFF | Last globally-defined error type. |
| 8000–FFFF | Chunk-specific errors - possible errors are listed with each chunk type. |

The "*END" chunk should be the last chunk in a packet and has no body.

A "*WHN" chunk states the conditions, listed in the following table, under which the receiver should send back a response or series of responses to the sender.

| Addresses | Type | Contents |
|---|---|---|
| 0000 | 8-bit integer | ONERROR-When errors should be sent. |
| 0001 | 8-bit integer | WAITONERR-What should be done when an error is sent. |
| 0002 | 8-bit integer | ONBUSY-What should be done if receiver is busy. |

The integer "ONERROR" determines when the receiver should send errors generated by parsing the packet. It has one of the values listed below.

| Value | Meaning |
|---|---|
| 0 (default) | Send errors as soon as they are detected - error per response packet. |
| 1 | Send errors as soon as the entire packet has been parsed - all errors in one response. |
| 2 | Send errors after the command completes - prepend the errors to the response to the command. |

The "WAITONERR" integer, which has one of the values listed below, determines whether the receiver should wait for a response to any error messages before proceeding.

| Value | Meaning |
|---|---|
| 0 (default) | Wait for a response from the sender before continuing processing of the packet. |
| 1 | Continue processing the packet after sending any errors. |

The "ONBUSY" integer, using one of the values below, indicates what the receiver should do if it is unable to process the commands in the packet immediately.

| Value | Meaning |
|---|---|
| 0 (default) | Queue the command for processing. |
| 1 | Queue the command for processing. Inform the sender that the command has been queued. |
| 2 | Queue the command for processing. Inform the sender when the command has been queued, and again when the receiver starts processing the command. |
| 3 | Do not queue the command. Inform the sender the command could not be processed. |

Some commands, e.g, "WHER" and "ABRT," which are described below, are not queued but instead are processed ahead of other queued commands.

A "*CMD" chunk contains the main command to be processed in the packet and is organized as shown in the table below.

| Addresses | Type | Contents |
|---|---|---|
| 00000–0003 | ASCII | Command type, not a null-terminated string. |
| 0004–nnn | Various | Command-specific fields. |

A "COMM" or comment chunk contains null-terminated ASCII text and can be ignored safely by all applications.

A "PRED" chunk lists dependencies for a packet, i.e., lists the packet IDs whose commands should be completed before the current packet can be processed. If a "PRED" chunk is not present, the system assumes there were no predecessors to the current packet. The chunk body thus consists of n 32-bit packet ID's, i.e., 4 n total bytes. The "PRED" chunk is necessary because packets can be queued asynchronously. For example, a packet which requests that rules be learned from examples should list as a predecessor the packet which loads the examples. The "PRED" chunk also allows for parallel or distributed processing of commands.

A "DEFS" chunk contains default values for the rule engine and is organized as shown in the table below. If a field has a value of −1 or contains an empty ASCIIZ, i.e., null-terminated, string, the present value is retained. If this chunk is sent to a server, the server's default values are changed to those specified in this chunk for all subsequent commands. Commands queued ahead of this chunk are not affected.

| Addresses | Type | Contents |
|---|---|---|
| 0000–0001 | 16-bit integer | Maximum rule order to be learned. |
| 0002–0005 | 32-bit integer | Maximum number of rules to be learned. |
| 0006–0009 | 32-bit float | Small sample k for statistics. |
| 000A–000D | 32-bit integer | Minimum number of rules which should agree with each rule to be learned. |
| 000E–0011 | 32-bit float | Minimum probability that learned rule is correct. |
| 0012–0015 | 32-bit float | Minimum rule priority to keep when learning rules. |
| 0016–0035 | ASCIIZ string | Attribute base. |
| 0036–0055 | ASCIIZ string | Rule base. |
| 0056–0075 | ASCIIZ string | Rule base list. |
| 0076–0095 | ASCIIZ string | Example list. |

The "DIRS" chunk appears as shown below and lists all objects of the specified type that are present in server memory.

| Addresses | Type | Contents |
|---|---|---|
| 0000 | 8-bit integer | Type of objects listed, or 0 for all objects. |
| 0001–0002 | 16-bit integer | Number of objects listed. |
| 0003–0004 | 16-bit integer | Size of each list entry in bytes. |
| 0005–???? | Various | List entries. |

List entries have the format shown below.

| Offset | Type | Contents |
|---|---|---|
| 0000–001F | ASCIIZ string | Name of object. |
| 0020 | 8-bit integer | Type of object. |
| 0021–0024 | 32-bit integer | Number of things, e.g., examples, rules, in object. |
| 0025–0028 | 32-bit integer | Size of object in bytes. |

A packet can contain any number of command chunks, including none. All commands in a packet should be related to each other. Command chunks can contain command-specific data starting at offset 0004 within the command chunk data.

A "WHER" command chunk is sent from a client to request the status of a server. This command should always be processed asynchronously, regardless of how many packets are queued when the command is received. The server sends back a "HERE" chunk in response. The "WHER" chunk is organized as shown in the following table.

| Addresses | Type | Contents |
|---|---|---|
| 0004–0007 | 32-bit integer | Type of status information requested, listed in table below. |

A "HERE" chunk contains the fields listed in the following table.

| Addresses | Type | Contents |
|---|---|---|
| 0004–0007 | 32-bit integer | Type of status information requested; list of types noted under "WHER" command. |
| 0008–nnn | Various | Specific status information. |

The "ABRT" command, which is sent from a client to a server to abort a command, should always be processed asynchronously. The command includes the fields shown in the following table.

| Addresses | Type | Contents |
|---|---|---|
| 0004–0007 | 32-bit integer | Packet ID containing command. |
| 0008–000B | 32-bit integer | Offset of command chunk in packet, 0 if aborting entire packet. |
| 000C | 8-bit integer | 0 - abort the rest of the packet.<br>1 - abort this command chunk and go on to the next command in the packet. |
| 000D | 8-bit integer | 0 - abort all successors to the command, reference "PRED" chunk<br>1 - do not abort successors to the command. |

A "LOAD" command loads data from a file into the server's memory. This should be the only way rules and examples are loaded from disk into the client or server the client should not load rules in its own routines.

| Addresses | Type | Contents |
|---|---|---|
| 0004 | 8-bit integer | Type of data to load. |
| 0005–0024 | ASCIIZ string | Symbolic name to give data, 32 characters. |
| 0025–0125 | ASCIIZ string | Filename to load data from, 256 characters. |

A "SAVE" command saves data from the server's memory to a file. Likewise, this should be the only way rules and examples are saved to disk from the client or server—the client should not save rules in its own routines. The "SAVE" command has the fields listed below.

| Addresses | Type | Contents |
|---|---|---|
| 0004 | 8-bit integer | Type of data to save. |
| 0005–0024 | ASCIIZ string | Symbolic name to save from, 32 characters. |
| 0025–0125 | ASCIIZ string | Filename to save data to, 256 characters. |

A "COPY" command, which includes the fields listed below, copies data from an area indicated by a symbolic name to another area in the server's memory.

| Addresses | Type | Contents |
|---|---|---|
| 0004 | 8-bit integer | Type of data to copy. |
| 0005–0024 | ASCIIZ string | Symbolic name to copy from, 32 characters. |
| 0025–0044 | ASCIIZ string | Symbolic name to copy to, 32 characters. |

A "FREE" command, which includes the fields in the following table, frees a memory object in the server's memory.

| Addresses | Type | Contents |
|---|---|---|
| 0004 | 8-bit integer | Type of data to free. |
| 0005–0024 | ASCIIZ string | Name of object, 32 characters. |

A "GETD" command, which is used to get all default values, has no fields and returns a "DEFS" chunk. A corresponding "SETD" command is not needed because the client is able to send instead the "DEFS" chunk with any necessary modifications.

A "LIST" command, organized as shown below, lists all structures of the specified type and returns a "DIRS" chunk. The DIRS chunk tells the pieces that are currently in memory—rules, rulebases, examples, attributes, etc. If the type is set to zero, the command lists all structures.

| Addresses | Type | Contents |
|---|---|---|
| 0004 | 8-bit integer | Type of data to list. |

The system also provides software functions such as the following.

AdmireSendPacket(HWND hwndDest, LPSTR packetcontents, integer timeout)

The function "AdmireSendPacket" asynchronously sends a packet and times out after the number of 10ths of a second indicated in the "timeout" field. The timeout procedure is necessary to avoid leaving the client in an endless loop if the server is inoperative, and vice versa.

The system also provides a handshaking procedure. The following describes the messages sent back and forth, i.e., handshaking, that is performed to initiate communications, process commands, and terminate communications.

When a client wishes to initiate communication, i.e., begin using the rule engine server, it should first establish a connection with the server. This is done as indicated below by sending a series of "HELLO,n" control messages back and forth, where "n" is the LOWORD, i.e., low data word, of "1param" for the HELLO message.

1. The client sends "HELLO,0" to all top-level windows, i.e., the main operating-system interfaces of applications, and waits for up to 3 seconds.
2. Each free, i.e., unattached, server responds with "HELLO,1" and then waits for a "HELLO,3" or "HELLO,4" response from the client. If the server receives a subsequent "HELLO,0" command from a different client, it queues that "HELLO,0" pending the response from the original client. Each busy, i.e., connected, server responds with "HELLO,2."
3. If the client receives at least one "HELLO,1" within the timeout period, it sends "HELLO,3" to the server to which it intends to connect and "HELLO,4" to all other free servers which responded.

4. The server which received "HELLO,3" responds "HELLO,2" to all subsequent "HELLO,0" commands, because it is now attached to a client. Servers which received "HELLO,4" return "HELLO,1" until they are also attached to clients.
5. If the client times out while waiting for a response, it starts up another instance of the server application program and goes back to step 1.

When a client wishes to stop using a rule server, it should negotiate an end to the connection using the following process.

1. The client sends a "BYE" control message to the server.
2. The server cleans up in preparation for exit by releasing to the operating system the memory, fonts, bitmaps, and other system resources it is using and also by sending messages back to the client during this period which, e.g., warn of unsaved files.
3. The server sends "BYE" to the client and breaks the connection. Depending on the nature of the server, it exits or remains loaded as a free server.
4. The client breaks the connection.

The currently-used system uses a command-line interface. The following commands are used to produce the system's output.

```
LEARN rbname {
        var1 value1
        var2 value2
        ...
        LHS attr1
        lhs attr2
        RHS attrn
        ...
        RHS attrn
}
```

The "LEARN" command learns a new rule base from examples and takes a list of parameters enclosed in brackets { }. Variables which are specified in capitals are mandatory; all others are taken from defaults if they are not present. Variable values are listed in pairs. There should be at least one attribute on the left-hand side and only one attribute on the right-hand side. The "}" bracket ends the parameter list for the "LEARN" command.

FILTER rbname filtertype value

The "FILTER" command filters the rule base with the types of filters listed and described below.

```
ALWAYS attr
NEVER attr
ONLY attr
PROB f
LITTLEJ f
PRIO f
WEIGHT f
LOWPROB f
```

The "ALWAYS" filter removes rules which do not contain the specified attribute on the left-hand side. Conversely, the "NEVER" filter removes rules which do contain the specified attribute on the left-hand side. The "ONLY" filter removes rules which have anything other than the specified attribute on the left-hand side.

The remainder of the filters listed above address threshold levels specified separately by "f." The "PROB" filter removes rules with an insufficient probability of being correct. Likewise, the "LITTLEJ," "PRIO," and "WEIGHT" filters remove rules wherein the J-measure, priority, and weight, respectively, are too low. Finally, the "LOWPROB" filter removes rules with an excessive probability of being correct.

The "LOWPROB" filter is used to split a rule base into two rule bases, one with high-probability rules and the other with low-probability rules. For example, the following steps can be performed using a set of rules "R1."

1. Copy R1 to Rhi.
2. Copy R1 to Rlo.
3. Filter Rhi with PROB 0.5.
4. Filter Rlo with LOWPROB 0.4999999.

The result is that rule base "Rhi" contains all of the high-probability rules and "Rlo" contains all of the rules of rule base "R1" that are not in rule base "Rhi." Moving the low-probability rules to a separate rule base eases analysis of them to determine whether they contain useful information.

PRUNE rbname

The "PRUNE" command uses subsumption pruning to remove unneeded rules from the rule base.

```
RBLIST rblname{
        rulebase1 flags1
        rulebase2 flags2
        ...
}
```

The "RBLIST" command creates a rule base list from the specified rule bases and applies the rule bases in proper order using the specific flags. The rule base list should contain at least one rule base and flags should be separated by vertical bars "|," e.g., "ALLLHS|GUESS."

The allowed flags have the following meanings. Flag "ALLLHS," if set, indicates that the system should have values for all of the LHS attributes in the rule base before applying the rule base. A set "GUESS" flag forces the system to guess the most likely RHS if no rules fire. If the "OVERWRITE" flag is set, the system determines a new RHS value even if the current RHS value is known. Output data from each inference is kept if the "KEEPOD" flag is set. Finally, a set "RANDOM" flag indicates that if more than one RHS value is possible, one should be picked randomly based on the probabilities of the values.

TEST name WITH exlist

The "TEST" command tests the rule base or rule base list with the example set and prints the test statistics. Testing a rulebase with a set of examples involves, for each example in turn, comparing the expected result from the example with the predicted result from the rulebase.

The "TEST" command then prints out statistics such as those in the illustration below.

Total examples: 3134

Examples classified: 3070 (98%)

Examples classified correctly: 1477 (48%)

Histogram of examples vs. rules fired per example:

| Rules | Examples |
|---|---|
| 0 | 64 |
| 1 | 6 |
| 2 | 53 |
| 3 | 50 |

-continued

| Rules | Examples |
|---|---|
| 4 | 108 |
| 5 | 210 |
| 6 | 252 |
| 7 | 363 |
| 8 | 454 |
| 9 | 395 |
| 10 | 302 |
| 11 | 305 |
| 12 | 239 |
| 13 | 198 |
| 14 | 61 |
| 15 | 45 |
| 16 | 25 |
| 17 | 2 |
| 18 | 2 |

Average rules per example: 8.551

Histogram of examples vs. popularity of right answer:

| Place | Examples | Avg. Rules |
|---|---|---|
| 1 | 1477 | 8.793 |
| 2 | 597 | 8.625 |
| 3 | 235 | 9.311 |
| 4 | 147 | 10.374 |
| 5 | 44 | 10.727 |
| 6 | 9 | 11.111 |
| No rules predicted correct RHS: | 625 | 0.000 |

In this illustration, the rule base was tested with a set of 3134 examples. If no rules fire, the rulebase does not make a classification. In 3070 of the examples, at least one rule fired. In 1477 of the examples, the rule base correctly classified the example.

The next section of the analysis shows a histogram of the number of rules fired. The histogram peaks at 8 rules per example and has an average of 8.551 rules per example.

The last section shows details about how successfully the rule base chose or at least suggested the correct answer. In 1477 of the examples, the rule base chose the correct answer. In 597 of the examples, the rule base selected the correct answer as the second-most-likely answer. In 625 of the examples, the rule base did not even suggest the correct answer as a possible answer.

The following describes commands relating to realtime inferencing.

```
    INDATA idname {        (*Process for setting attributes
                           from other attributes *)
    attr1 FROM attr2
    attr2 UNKNOWN
    attr3 TO val
    IF attr1 val1 THEN attr2 from attr3
}
```

The "INDATA" command creates the input data and should have at least one attribute-value pair. All values are initially set to a value of "UNKNOWN." For each attribute, the command gets its next value according to the following procedure in this example. First, the value of attribute "attr1" is copied from attribute "attr2." Next, attribute "attr2" is set to "UNKNOWN." Then attribute "attr3" is set to the specified value "val." Finally, the value of attribute "attr2" is copied from the value of attribute "attr3" only if attribute "attr1" has the value "val1."

The values "val" and "val1" are explicitly specified. For example, in a harmony "INDATA," the following setting is made at the start of each timestep.

Function0 UNKNOWN

Such a setting is equivalent to the following.

Function0 TO "?"

The "TO" operator can also be used to test a rule base which has more flexibility than is necessary at the moment. For instance, if a rulebase has rules for both major and minor keys, the following setting can be made to restrict use to the rules for the major key only.

MajMin TO Major

To ensure that an attribute's value is updated only under certain conditions, a directive such as the following can be used.

IF Accent1 ACC THEN FunctionLA from Function1

This directive copies the value from the previous timestep's function "Function1" into the previous accented beat's function "FunctionLA" only if the previous timestep was accented, i.e., "Accent1" had the value "ACC."

```
REALTIMEMIDI {
        rblist
        indata idname
}
```

The "REALTIMEMIDI" command harmonizes a melody in real time and expects the input data to contain the following attributes: Melody0, Function0, Inversion0, Alto0, and Tenor0. The rule base list to use, if not the default, is specified by "rblist." Likewise, the input data to use, if not the default data, is specified by applying the "indata."

NEW type name n

The "NEW" command creates a new empty structure capable of holding n elements, e.g., "NEW RBLIST simpleharm 16." Rule base lists are composed of rule bases which in turn are composed of rules. Likewise, example lists are composed of examples and attribute bases are composed of attributes.

JOIN name AND name INTO name

The "JOIN" command allows two rule bases to be merged to create a new rule base.

F. Other Embodiments

The embodiments described above are but examples, which can be modified in many ways within the scope of the appended claims. For example, the invention can also use accent-based conversion, wherein additional example fields are allowed to be created for previous timesteps which start at the beginning of a beat, accented beat, or fermata. In accent-based conversion, only one example is created per timestep, so it is not necessary to weight the examples, a list of which would likely appear as follows.

```
%NAME 0 FunctionLastAccentedBeat
%NAME 1 FunctionLastBeat
%NAME 2 Function1
%NAME 3 Function0
—     —     —     I
—     I     I     I
I     I     I     IV
I     IV    IV    vi
I     IV    vi    V
```

With accent-based conversion, it is possible for the first three fields to refer to the same timestep if the previous timestep was at the start of an accented beat. Such redundancy, which leads to highly interdependent rules, makes real-time independence pruning essential.

Furthermore, the invention can use non-MIDI input sources, such as pitch data from a microphone, allowing a vocalist to sing or hum a tune which is converted into pitches and used to generate a harmony. Likewise, the invention can accept pitch data from a program, such as a program according to the invention which generates melodies instead of harmonies.

In addition, the invention can be applied to assist in the derivation of a representation for the overall structure of a piece of music by encoding information about phrases and sections in music, such as the verse-chorus structure common to much vocal music. The invention can also provide a system which includes cues for modulation from one key to another.

In addition, the invention can provide a system allowing voices to make jumps over awkward intervals such as tritones or over distances further than an octave. Furthermore, the invention can provide a system realizing a figured bass that allows two voices to cross or to play in unison, i.e., play the same pitch. The invention can also provide a system that develops information about whether voices are changing pitch in the same or different direction as other voices.

Moreover, the invention can provide a system that detects ornaments, described above, which are usually used to smooth a voice line by removing large jumps in pitch. The invention can add such ornaments to generated harmonies to make them more interesting.

Furthermore, the invention can provide a system relating to drums and other percussion instruments, by using a notation for rhythm.

In addition, the invention can provide a system relating to orchestration and part writing in the areas of music involving expansion of four-part harmony into sufficient additional lines so that each instrument in an orchestra has something interesting to play, in the pitch range which the instrument can generate. The invention can also assist in research focusing on the methods used to duplicate and modify voice lines to produce distinct parts, and ways of moving the melody between instruments.

Likewise, the invention can provide a system relating to similar concepts needed to reproduce contemporary music, wherein the harmonic information is distributed between a vocalist, lead guitar, bass guitar, keyboard player, and other instruments.

In addition, the invention can use Bach inventions, sinfonias, and fugues to learn rules for counterpoint and development of a theme or motive. Similarly, the invention can assist in the study of methods for employing chord accents in syncopated rhythms to provide extracts from ragtime pieces by Scott Joplin, for instance. Furthermore, the invention can use, for example, African drum music or any other sound to develop rhythm notation.

Moreover, the invention can assist in research focusing on the differences between the styles of various composers to determine, e.g., what makes Mozart piano sonatas sound different than Beethoven piano sonatas, and how the choral works of Bach differ from those of Handel.

Other embodiments:

Extending Temporal Knowledge

Existing rulebase sets look only at the accent of the current chord and the information from the previous few chords. This limits the ability of the rulebases to compensate for and generate harmonic transitions on a larger scale.

Deriving a representation for the overall structure of a piece of music would allow ADMIRE additional flexibility in this regard. Such a representation would encode information about phrases and sections in music, such as the verse-chorus structure common to much vocal music. It would also include cues for modulation from one key to another.

Counterpoint and Voice Leading

Although the existing voice position rules perform an acceptable job of filling in the pitches used by a given chord, they do little to make the individual voices singable. Voices often have jumps over awkward intervals such as tritones or distances over an octave. Furthermore, the current method for realizing a figured bass does not allow two voices to play a unison (play the same pitch), nor does it allow voices to cross. It also lacks information about whether voices are changing pitch in the same or different direction as other voices.

Additional adding of ornamentation can be used to smooth a voice line by removing large jumps in pitch. Once ornaments are well understood, they could also be added to generated harmonies to make them more interesting.

6.3 Rhythm Notation and Percussion

Most contemporary music includes drums and other percussion instruments. Drum parts tend to change on a measure-by-measure basis, and an entire piece of music may contain relatively few distinct drum patterns which are combined in various orders. In addition, most percussion sounds are to a large extent atonal; the information contained in their parts is almost entirely rhythmic. These differences will necessitate a notation for rhythm that is much different than the pitch-based or chord-based representations currently used in ADMIRE>

Orchestration and Part Writing

Orchestration and part writing are the areas of music involving expansion of four-part harmony into sufficient additional lines so that each instrument in an orchestra has something interesting to play, in the pitch range which the instrument can generate. Research here could focus on the methods used to duplicate and modify voice lines to produce distinct parts, and ways of moving the melody between instruments.

Different Forms of Music

Once the rules of Bach chorales are well understood, research could be expanded to encompass other musical forms. Bach inventions, sinfonias, and fugues could be used to learn rules for counterpoint and development of a theme or motive. Methods for employing chord accents in syncopated rhythms could be extracts from ragtime pieces by Scott Joplin. Rhythm notation could be developed on African drum music. Orchestral works by Mozart and Haydn could be used as examples for part writing and orchestration, with Beatles music serving in a similar role for contemporary music.

Research could also focus on the differences between the styles of various composers. What makes Mozart piano sonatas sound different than Beethoven piano sonatas, and how do the choral works of Bach differ from those of Handel? Since the algorithms used are all rule-based, it is possible to investigate the rules which are generated and how they are fired.

All of these modifications are intended to be encompassed within the following claims, in which:

Additional aspects define how the rules are generated and how they are fired, and enable additional features to be carried out. These additional features are described herein.

1. Real-Time Key Detection.

Figure 15:
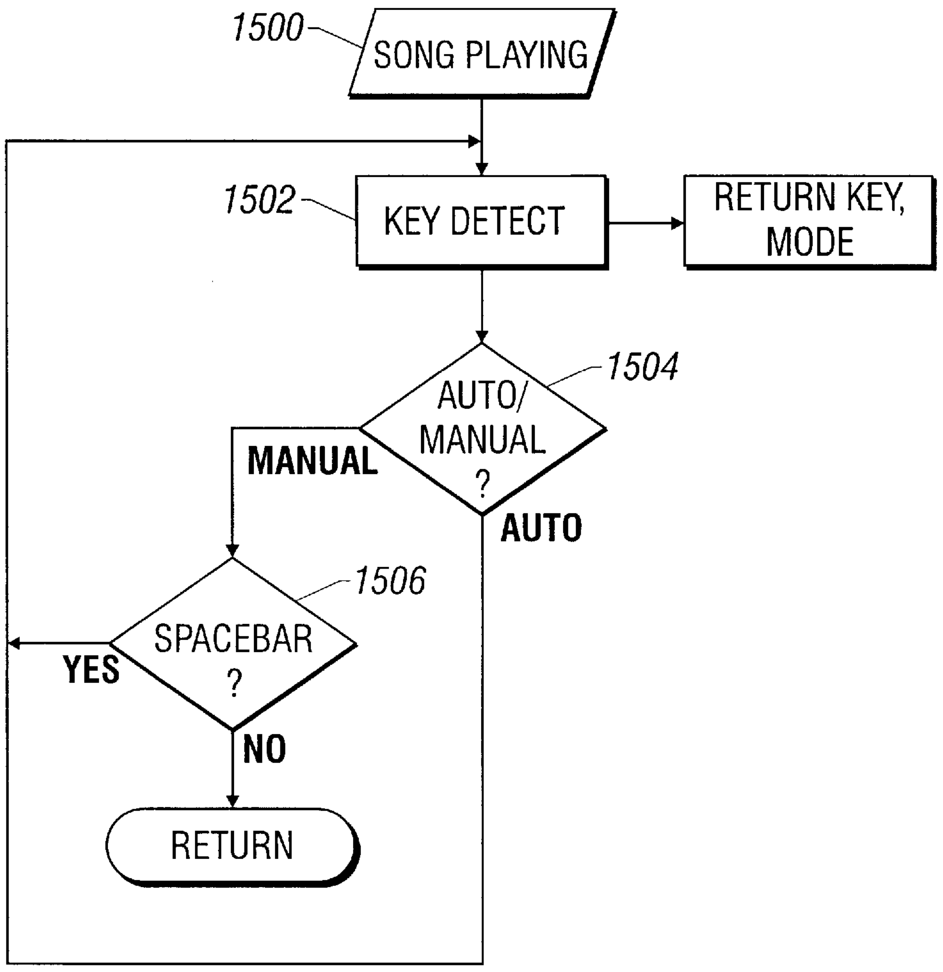
FIGS. 15–16 show flowcharts of improvements.

Algorithms are known which carry out real time detection of key of a musical piece. One example is found in U.S. Pat. No. 5,412,156. FIG. 15 shows the operation. The system applies a key detector as shown in step 1502. The key detector detects the key, and the mode of the key, i.e., major or minor. Step 1504 indicates whether the key detection is manual or automatic. If manual, according to a first embodiment of the invention, the key is detected by hitting the spacebar at step 1506. Each time the spacebar is depressed, the system finds a new key at step 1502. Each time a new key is found, the system autoharmonizes with that new key using the rules as previously discussed.

The automatic configuration uses continuous automatic recognition. The continuous key recognition begins by looking at the first five pitches that are played. The system determines the key and the mode from those first fire notes. After five notes have been played, it has been empirically found that there is 80% detection accuracy.

This preferred system uses the automatic key detection techniques from U.S. Pat. No. 5,412,156, the disclosure of which is herein incorporated by reference.

2. Quantization and Auto Tempo Detection.

The inventors recognized that understanding the tempo of a musical piece helps determine a new rule about the musical piece. Take for example, the Twelve Bar Blues. This well known combination includes meters of four surrounded by meters of eight. Recognition of the Twelve Bar Blues as such, allows determination of the best place and type for accompanying chords. This hence improves the sophistication of the system. The flowchart of this operation follows.

Figure 16:
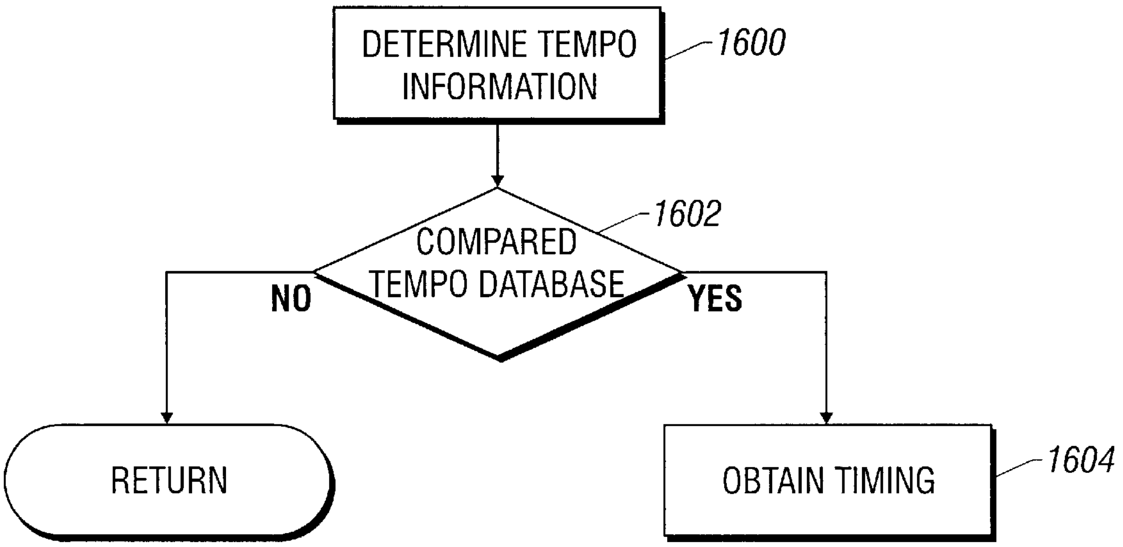

FIG. 16 shows a flowchart of this operation. In step 1600, the system electronically compares the music tempo by determining common clusters of notes and spacing between the notes. From this, the system determines a tempo information of the current music being played. At step 1602, the current tempo information is compared against a tempo database. If there is a match at step 1604, then timing information from the tempo database is obtained. The tempo database can include, for example, multiple different tempos and chord combinations for use with the 12 bar blues. If not, however, the process returns. Further modifications are of course possible.

To generate a tolerable accompaniment for Bach chorale melodies, little knowledge of tempo is needed. The harmony simply needs to change each time the melody changes. The only major exception is when the melody has a fermata (or held note)—this held note typically needs to have a musically more stable accompaniment chord.

However, it is highly desirable to incorporate tempo information whenever possible. For other styles of music, such as contemporary music (Beatles, Genesis, etc.) or 12-bar blues, temporal knowledge is essential for generating an acceptable harmony.

Several methods for determining tempo already exist, such as using autocorrelation, a series of comb filters, or a series of resonators.

On a beat-by-beat level, temporal knowledge can be used to determine which chords need to be more stable. Accompaniment chords played ON the beat need to be more stable than those played OFF the beat, and chords played on strong beats in general need to be more stable than those played on weak beats. The term "stable" here is used as a measure of dissonance, and/or whether the chord needs to resolve musically to another chord in the near future to remove the unsettling effect caused by the dissonance.

On a beat-by-beat level, temporal knowledge can be used to determine where to add ornamentation to harmony. Classical composers such as Bach and Mozart added ornamentation such as passing tones, trills, and neighbor tones to accompaniment voices, so that those voices were more musically interesting. These ornaments usually occurred between changes in the melody note (often at the halfway point between two beats). Generating ornaments requires knowing the current tempo of the piece, so that the ornaments can be properly timed.

On a measure-by-measure level, temporal knowledge can be used to determine when to change the accompaniment for contemporary harmony. Where Bach chorales change the accompaniment every time the melody note changes, contemporary music such as the Beatles often only changes accompaniment at the beginning of each measure, or to emphasize a certain section of melody. Temporal information can thus be used to determine whether the piece of music is at an appropriate place for a chord change.

On a section-by-section level, many types of music have a larger overall structure. For example, folk music often has sections of less restrictive music interleaved with sections of a chorus. Temporal knowledge allows the accompaniment algorithm to know when the chorus is being played, since the accompaniments for the choruses should be very similar to each other. Temporal knowledge here could be used to switch which rulesets are used for each section of the piece (with one ruleset for the chorus section and one for the less restrictive sections), or could be used to say "we're at a chorus—remember the harmony you played at the last chorus and play that same harmony again". A similar sort of process is necessary for music such as 12-bar blues. This has a less-restrictive section in the middle, enclosed by more standard chord progressions on either end. Knowledge of where the performer is in this progression allows the system to select the proper rulesets to use for the current section.

Tempo can also be used in more subtle ways to affect the accompaniment. If the tempo of the music increases, this might be used to indicate that the music should also become more dissonant to increase the musical tension. If the tempo of the music decreases, this might be used to indicate that the accompaniment should become less dissonant to relax the musical tension. Tempo can thus be used as an additional control parameter (similar to volume, pitch, and tone color) that a live performer can use to influence the computer-generated accompaniment without explicitly having to tell the accompanying system what to do. This is important for real-time accompaniment, where the performer would like to be able to concentrate as much as possible on his/her own performance.

3. Multithreaded Rule Engine.

A multithreaded rule engine allows making the best decision in limited time. The previously described rules are arranged in order from high priority rules to low priority rules. Hence, the high priority rules are executed first. A multithreaded system allows setting a time and determining the best decision at that moment.

In real-time environments, current decision making algorithms have a weakness. These algorithms need to wait until the algorithm finishes to get any sort of result from it. In general, there is no way to get an intermediate prediction from the algorithm before the full time has elapsed. This is especially true of analog neural networks. Because of this limitation, real-time systems have been forced to use simplified algorithms which can be executed quickly, but are not as accurate, or to accept a greater-than-desired delay in getting a result from the algorithm.

This is conceivably problematic in automated music. A simplified algorithm generates musically uninteresting accompaniment. A delay in generating the accompaniment results in an "echo chamber" effect, where the notes played by the accompaniment system are clearly heard as starting after the notes played by the performer. (It is also problematic in areas like real-time control—say, docking a cargo ship onto a Russian space station).

The multithreaded extension is capable of being interrupted in the middle of a prediction to produce a meaningful intermediate result. The system currently runs under Windows 95, but can be ported to any other multithreaded/preemptively multitasked operating system (e.g., Windows NT, Unix, etc.).

The ADMIRE-M technique runs primarily in its own thread, and is controlled by one or more other threads (these threads may be primarily attached to I/O, drawing the display window, etc.) This is different than the previous (single-threaded) implementation, where one thread controls I/O and the display and the rule algorithm. In that previous implementation, when the algorithm was running, the other tasks (display, I/O) were paused until the algorithm finished.

The basic technique uses the following operation:

1. Note-on pressed on keyboard,
2. Note-on received by computer,
3. Computer starts ADMIRE algorithm on harmony rulebase to predict chord function,
   3.1 Algorithm searches down list of rules for ones that can fire, accumulating rule weights into an array,
   3.2 Array is converted into probabilities for outputs,
   3.3 An output is chosen based on those probabilities,
4. ADMIRE algorithm finishes, returns result,
5. Computer starts ADMIRE algorithm on inversion rulebase (etc.).

ADMIRE-M takes advantage of the way ADMIRE orders rules in decreasing priority. This means that the rules which are worth the most—the rules which fire most frequently and/or give the most information—are evaluated first. For example, if ADMIRE-M is interrupted after it has only looked at the first half of the rules in a rulebase, we know that it is looked at the BEST half of the rules. The accumulated rule weights are thus probabilistically the most likely to succeed if the entire list of rules were examined.

Here's a flow diagram of the new technique if it is not interrupted:

1. Note-on pressed on keyboard,
2. Note-on received by computer,
3. Controller thread starts ADMIRE-M thread processing harmony rulebase to predict chord function. Other controller thread is still active, and doing things like watching elapsed time, checking for user input, drawing the display,
   3.1 Algorithm searches down list of rules for ones that can fire, accumulating rule weights into an array,
   3.2 Array is converted into probabilities for outputs,
   3.3 An output is chosen based on those probabilities,
4. ADMIRE-M thread finishes, returns result to controller thread,
5. Controller thread starts ADMIRE-M thread processing inversion rulebase (etc.).

Suppose, for example, that we want to make sure that the time spent calculating the chord function is no more than 10 ms. To do this with the original ADMIRE algorithm, or any other algorithm like an analog neural network would require that the worst-case time it could take to run the algorithm is less than 10 ms. This might limit us to a relatively short list of rules for ADMIRE, or a relatively small number of nodes in the ANN. However, for ADMIRE-M, we can still use a long list of rules, and stop the algorithm from evaluating rules only when it runs out of time. This means that we are always using the full amount of time and processor power available to us to make our decisions. This is better than the original algorithm, which only uses all available time in a worst-case situation.

Here's a flow diagram of the new technique being interrupted:

1. Note-on pressed on keyboard,
2. Note-on received by computer,
3. Controller thread starts ADMIRE-M thread processing harmony rulebase to predict chord function (controller thread is still active, and doing things like watching elapsed time, checking for user input, drawing the display),
4. Algorithm searches down list of rules for ones that can fire, accumulating rule weights into an array,
5. Controller thread determines that we are running out of time,
6. Controller thread tells the ADMIRE-M thread to stop processing rules and return a result as soon as possible,
7. Algorithm stops searching down list of rules (but has already evaluated the best rules),
8. Array from rules evaluated so far is converted into probabilities for outputs,
9. An output is chosen based on those probabilities
10. ADMIRE-M thread finishes, returns result to controller thread,
11. Controller thread starts ADMIRE-M thread processing inversion rulebase (etc.).

4. Non-boolean Error Measure.

Previous rules were ranked according to errors. All values for an attribute were considered equidistant from each other in error space. However, it has been found by the inventors that this is not true for music. For example, a chord could be only slightly wrong, or could be very badly wrong. According to this non-boolean error measure, the result of operations is quantified based on how wrong it is. Hence, this measure of rule worth takes into account not only how often a rule is incorrect, but also how bad the mistakes it makes are when they are incorrect—how bad. This rule measure may be useful in learning rules for continuous as compared with discrete output attributes. Hence, this system determines the musical cost of the item being incorrect.

5. Explicit Learning of Exceptions.

The inventors have now recognized that exceptions to the rules allow better flexibility. The rule system is now improved using exceptions that take into account on their lefthand side either the proposed value of the attribute to be inferred, or a rule in the base that ruleset fired. The rules would have one of the two forms:

BASE RULE (Part of a base ruleset - this might be rule #23, for example): IF Functionl = V AND MelodyO = C THEN FunctionO = I
EXCEPTION, FORM (1): IF (proposed value of) FunctionO = I AND AccentO = unacc THEN (revise value to) Function O = vi
EXCEPTION, FORM (2): IF (rule #23 in base ruleset fired) AND AccentO = unacc THEN (revise value to) FunctionO = vi The exceptions enable the rule base to include more features.

The current rule algorithm learns rules which predict the value of an output attribute given the values of one or more input attributes. Currently, the output attribute values are all considered equidistant from each other. What this means is that the rule engine focuses only on how often the correct output was produced and not at all on how "bad" the output was when it was incorrect. All wrong answers are considered equally wrong.

In the real world, this is almost never the case. Some mistakes are worse than others. For example, say you've designed a computer driver, and you have a rulebase which decides whether to step on the brakes or not. If the driver erroneously steps on the brakes sometimes when it shouldn't, the likely costs include increased travel time, and maybe a few people behind you honking at you. However, if the driver doesn't stop when it should stop, the cost may be an accident resulting in loss of property or life. Here, the mistake of "not stopping when you should" carries a higher cost than the mistake of "stopping when you shouldn't".

This is also true for musical rules. If you're supposed to play a F-major-7th chord and you play an F-major chord instead, that's not very noticeable. If instead you play a B-diminished-7th chord instead, that's very noticeable. Here, the cost of "playing F-major when you should play F-major-7th" is lower than the cost of "playing B-diminished-7th when you should play F- major-7th".

The new technique takes advantage of information about the cost of classification mistakes. The J-measure as described above is replaced with a new measure which includes terms for the costs associated with misclassification errors.

Error Cost

Define the error cost C(a,b) as the cost of misclassifying an "a" as a "b". The cost associated with the rule engine predicting an output of "b" when the right answer was "a".

Define the error cost C(A,B; Y=y) as the cost of misclassifying an "a" as a "b" given that Y=y. The cost associated with the rule engine predicting an output of "b" when the right answer was "a", given that we also know the input attribute Y has a value of "y". Note that without loss of generality, Y and "y" may also be arrays of multiple input attributes and values.

Cost does not need to depend on all or any of the input attributes. An example cost for predicting chords might be how many of the notes are different between the correct chord and the predicted chord (so GBDF# to GBDG has a cost of 1, but GBDF# to GBEE has a cost of 2 since it has two wrong notes).

The rule generation algorithm must be provided with a way of determining the error cost. Whether this information is provided to the algorithm as a table or as a function that can be called "doesn't matter".

Tolerance Factor

Define the tolerance factor T as measuring how tolerant the system is of mistakes. If T is small, the system is more tolerant of rules which make small mistakes. If T is arbitrarily large, the system considers small and large mistakes equally (horribly) bad.

We desire that making T arbitrarily large should allow us to get back a rule measure approximating the original J-measure which considers all mistakes to be equally bad.

Given our error cost and tolerance factor, we can define the following cost acceptability term:

$$CA(x,b)=\exp(-T\cdot C(x,b))$$

Note that this has the desired dependence on T. If T is small, CA,(x,b) is relatively large even if C(x,b) is nonzero—which means that the system is tolerant of mistakes. If T is arbitraily large, then CA(x,b) will be arbitrarily close to zero for any nonzero C(x,b).

The function for cost acceptability does not necessarily need to be exp(x)—it could be any function which is 1 at x=0 and 0 as x→infinity.

Cost Probability

Define the cost probability CP(x) as follows:

$$CP(x)=\sum_{\delta} CA(x,b)\cdot p(b)$$

$$CP(x\backslash y)=\sum_{\delta} CA(x,b)\cdot p(b\backslash y)$$

Again, note that if T is arbitrarily large, CP(x)→p(x) and CP(x|)y→p(x|y).

Define the normalized cost probability NCP(x) as follows:

$$NCP(x)=\frac{CP(x)}{\sum_{\delta} CP(b)}$$

$$NCP(x|y)=\frac{CP(x|y)}{\sum_{\delta} CP(b|y)}$$

Note that these still preserve NCP(x)→p(x) and NCP(x|y) for large T, and also have the desirable property of summing to 1 like real probabilities.

The CJ-Measure

The original J-measure is as follows:

$$J(X;Y=y)=p(y)\cdot\left[p(x|y)\cdot\log\left(\left(\frac{p(x|y)}{p(x)}\right)+(1-p(x|y))\cdot\log\left(\frac{(1-p(x|y))}{(1-p(x))}\right)\right]\right.$$

The improved CJ-measure (Cost-J-Measure) is as follows:

$$CJ(X;Y=y)=p(y)\cdot\left[NCP(x|y)\cdot\log\left(\frac{NCP(x|y)}{NCP(x)}\right)+(1-NCP(x|y))\cdot\log\left(\frac{(1-NCP(x|y))}{(1-NCP(x))}\right)\right]$$

Description of the Preferred Embodiments

What is claimed is:

1. A method of composing music, comprising:

receiving a first series of musical notes defining a first melody having a first harmony;

automatically detecting a musical key defined by said first series of musical notes;

analyzing the first harmony within the first melody using said automatically-detected musical key, by forming examples from the first series of musical notes, and deriving, in real-time, at least first and second rules relating to the first melody, the second rule conflicting with the first rule, and each of said first and second rules including a weight associated therewith;

receiving additional notes of said melody and forming additional examples from said additional notes;

determining ones of said additional examples that agree with said first rule and increasing a weight of said first rule when an example agrees with said first rule, and determining ones of said additional examples that agree with said second rule and increasing a weight of said second rule when an example agrees with said second rule;

receiving another melody to which a harmony is to be formed;

evaluating said another melody using both of said first and second rules; and when both said first and second rules each apply to said another melody, applying the one of said rules which has the higher weight to said melody, in real-time.

* * * * *